Dec. 23, 1941.  E. J. SVENSON  2,266,829
METALWORKING APPARATUS
Filed March 30, 1936   12 Sheets-Sheet 4
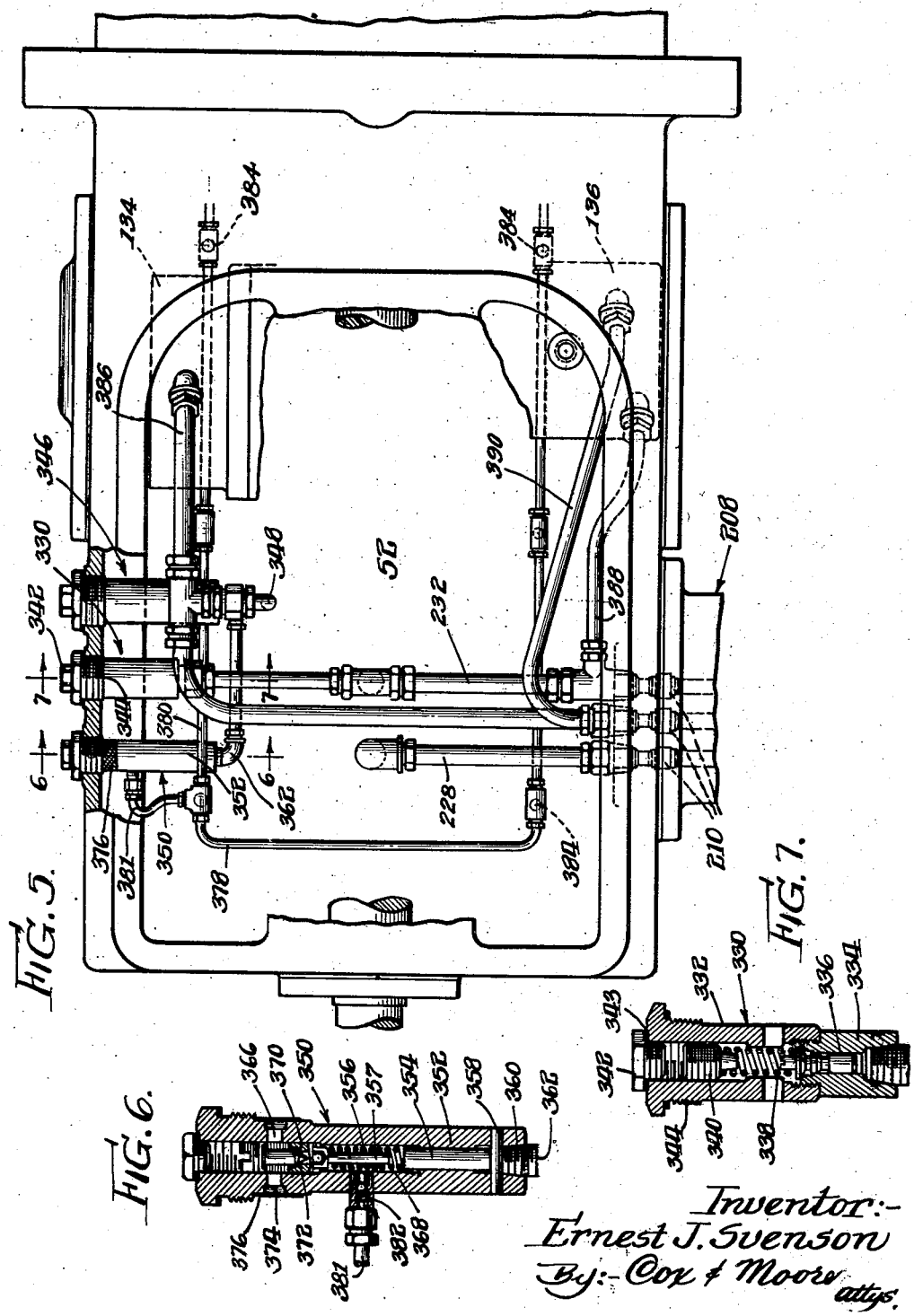

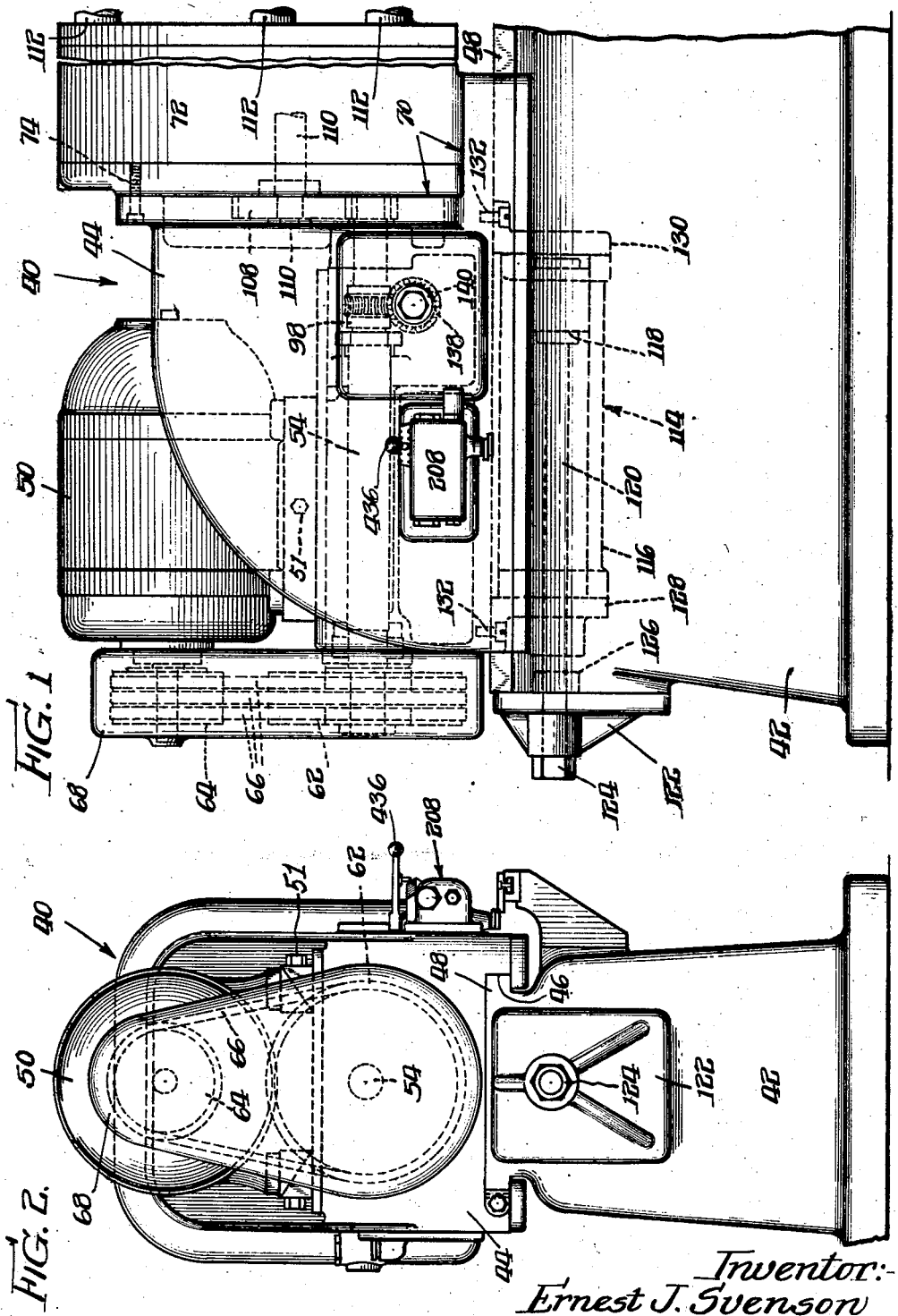

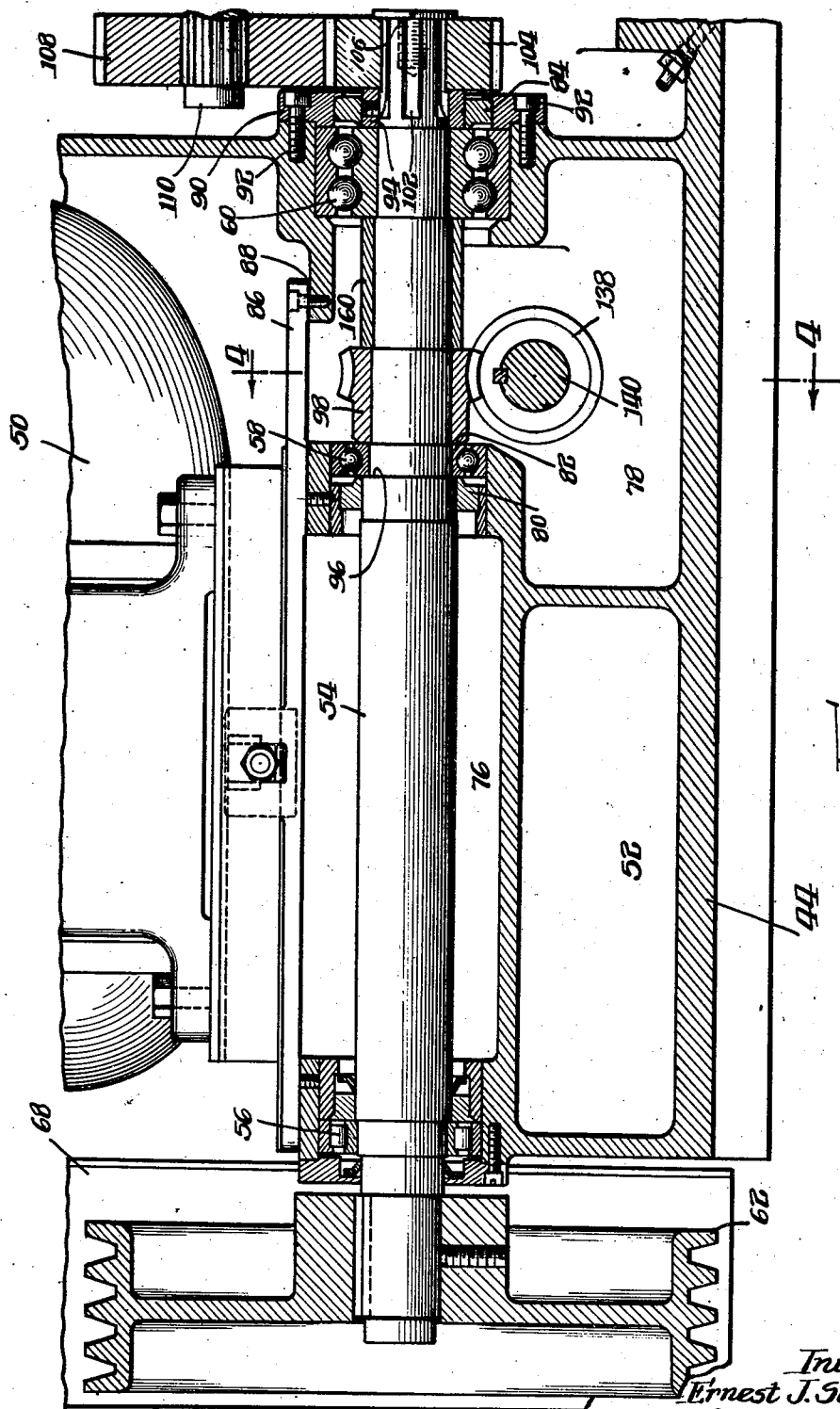

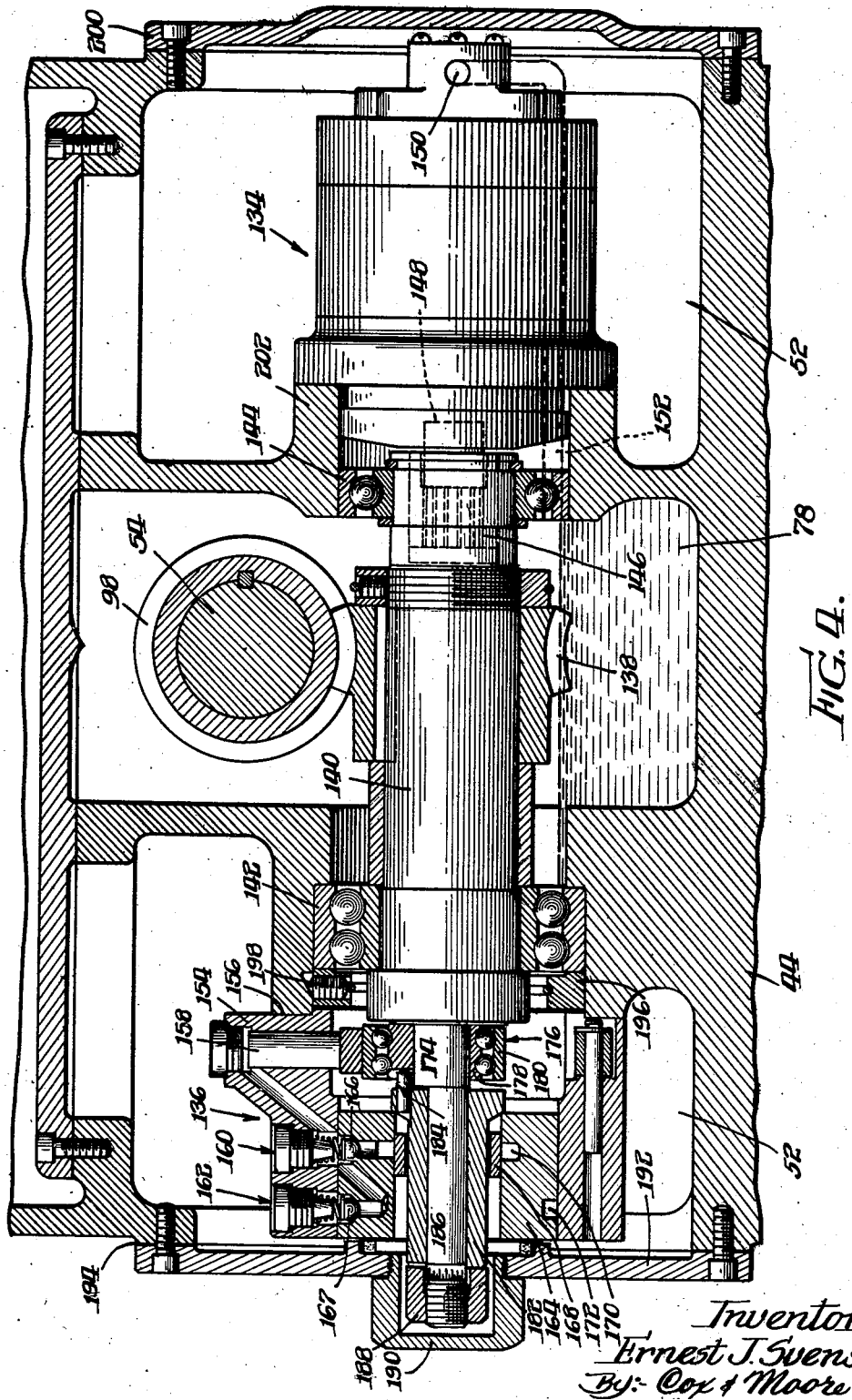

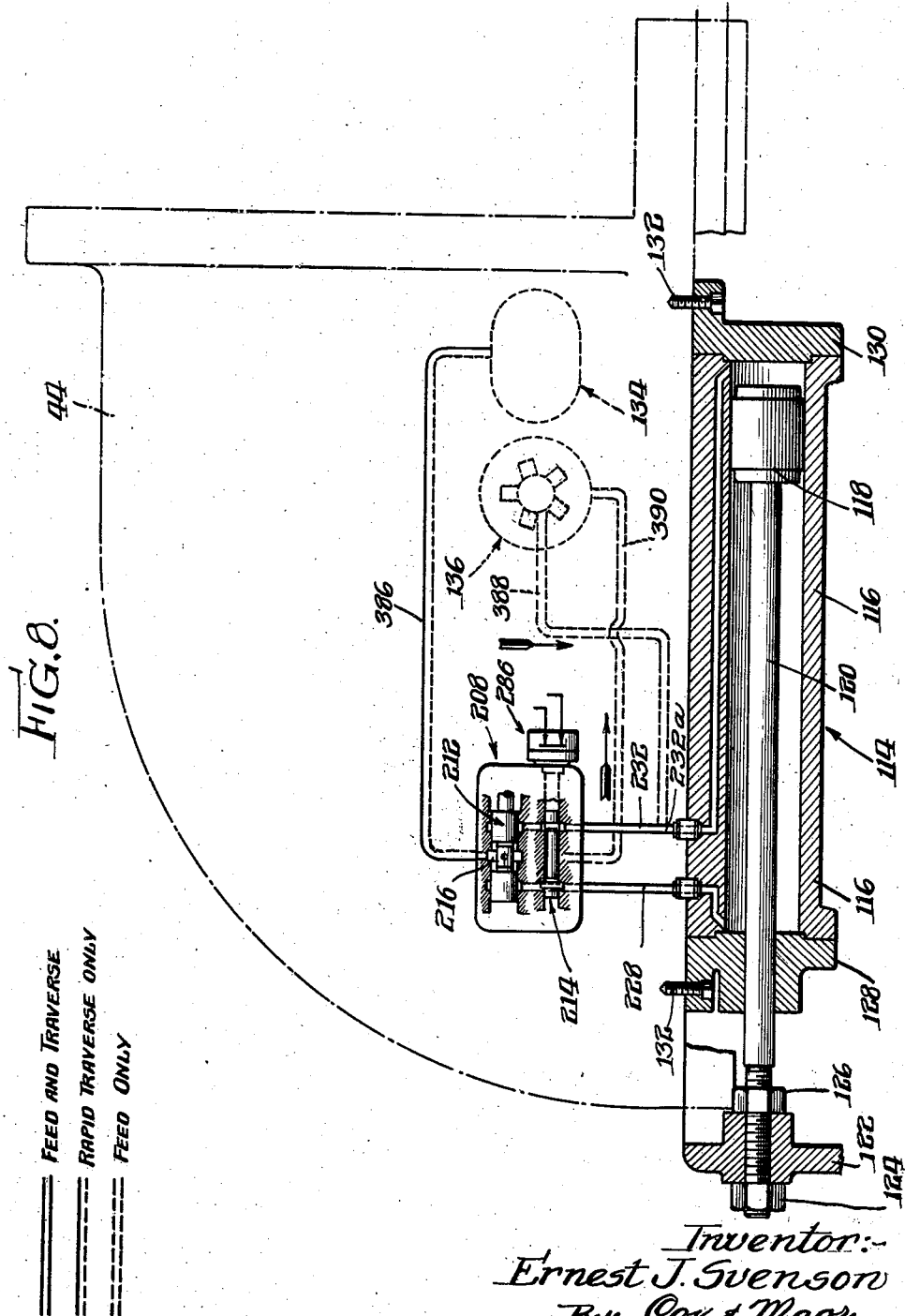

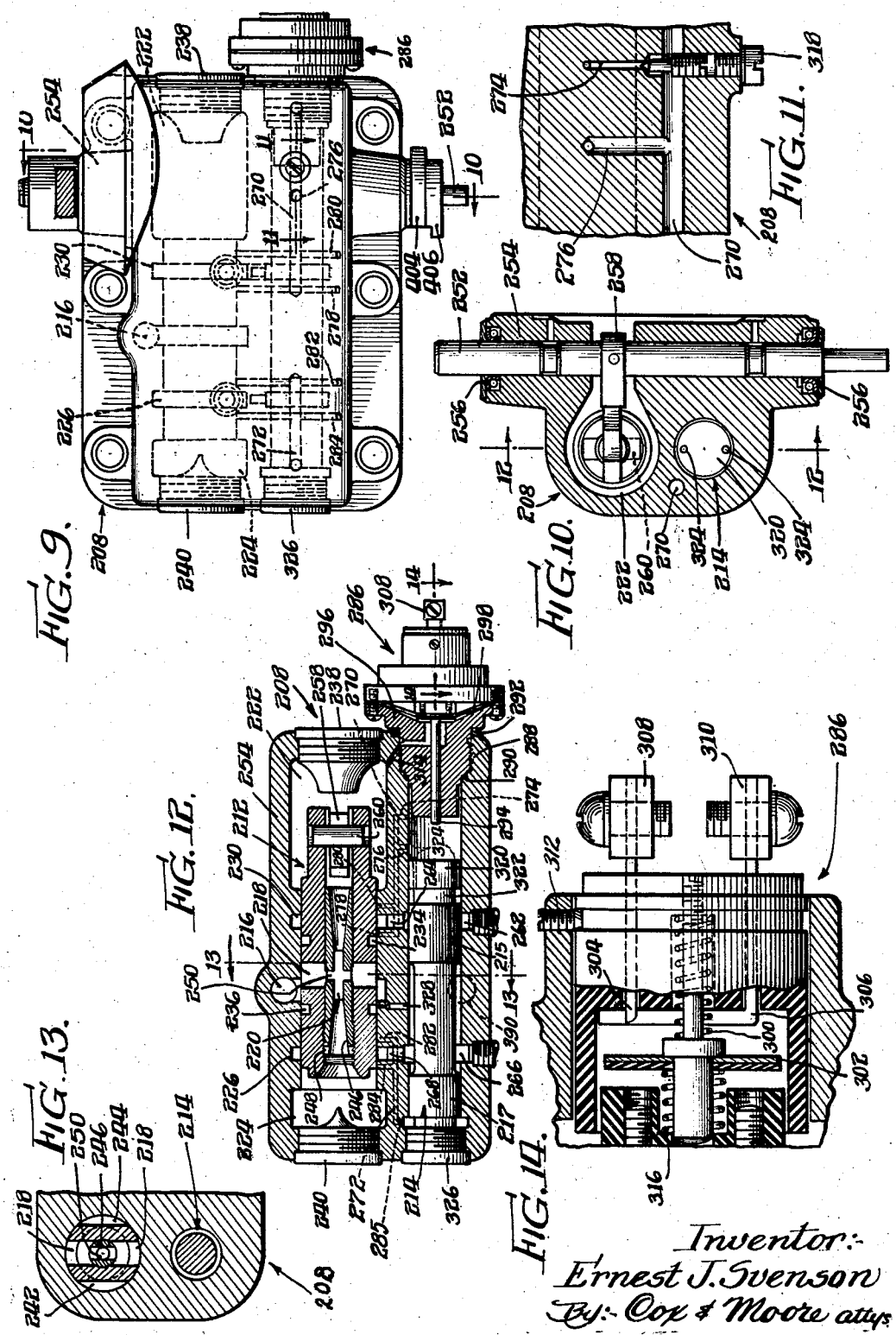

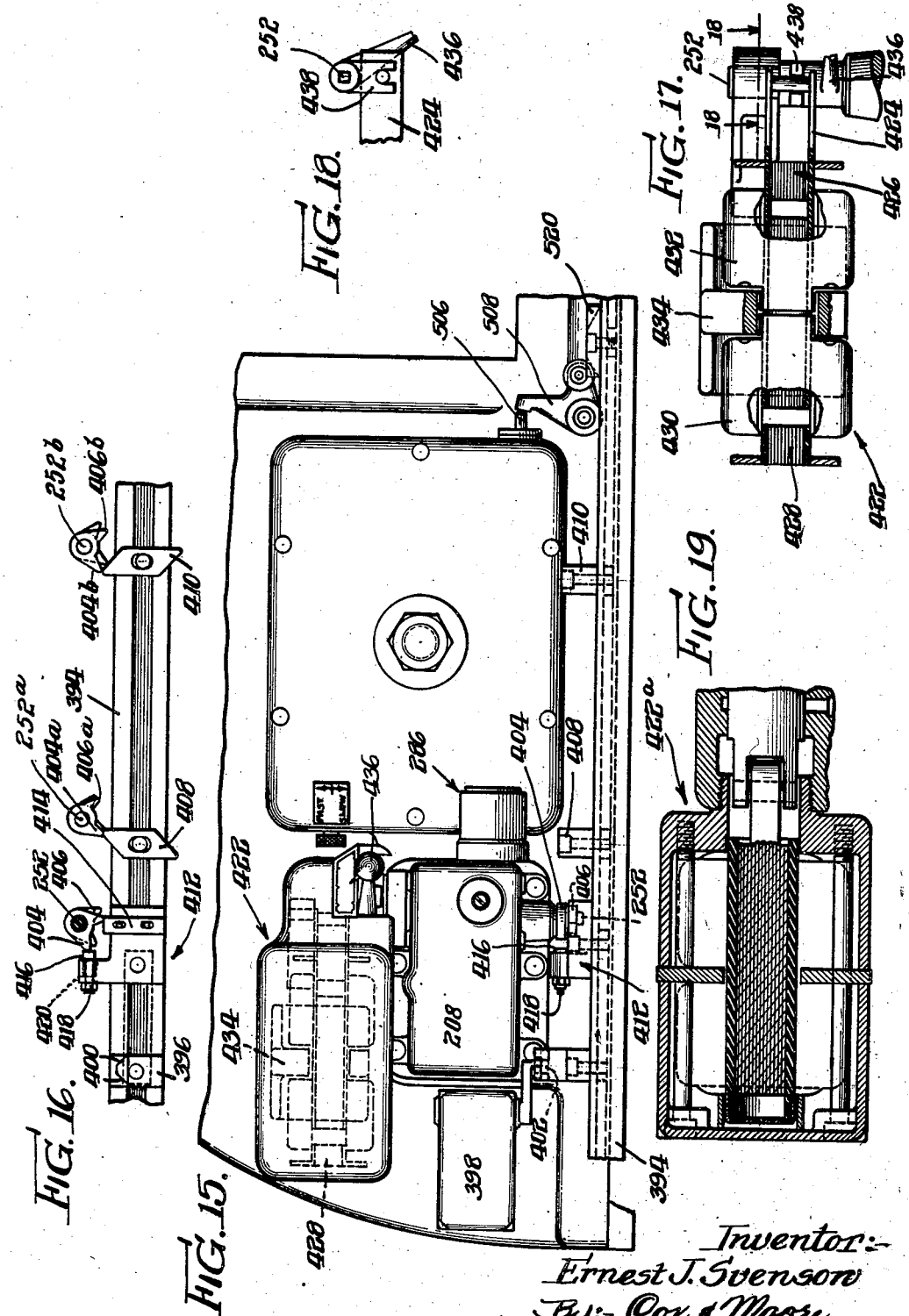

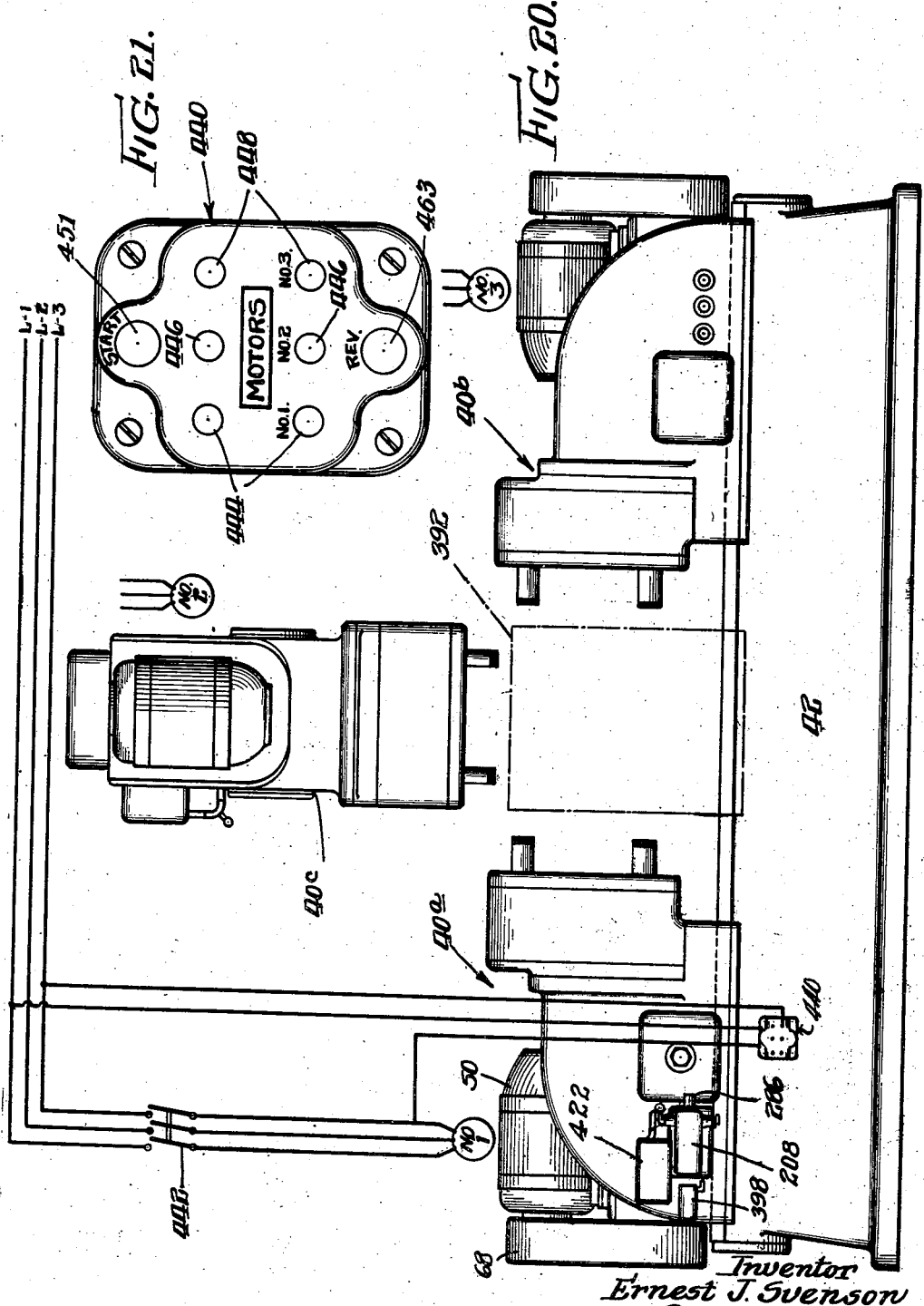

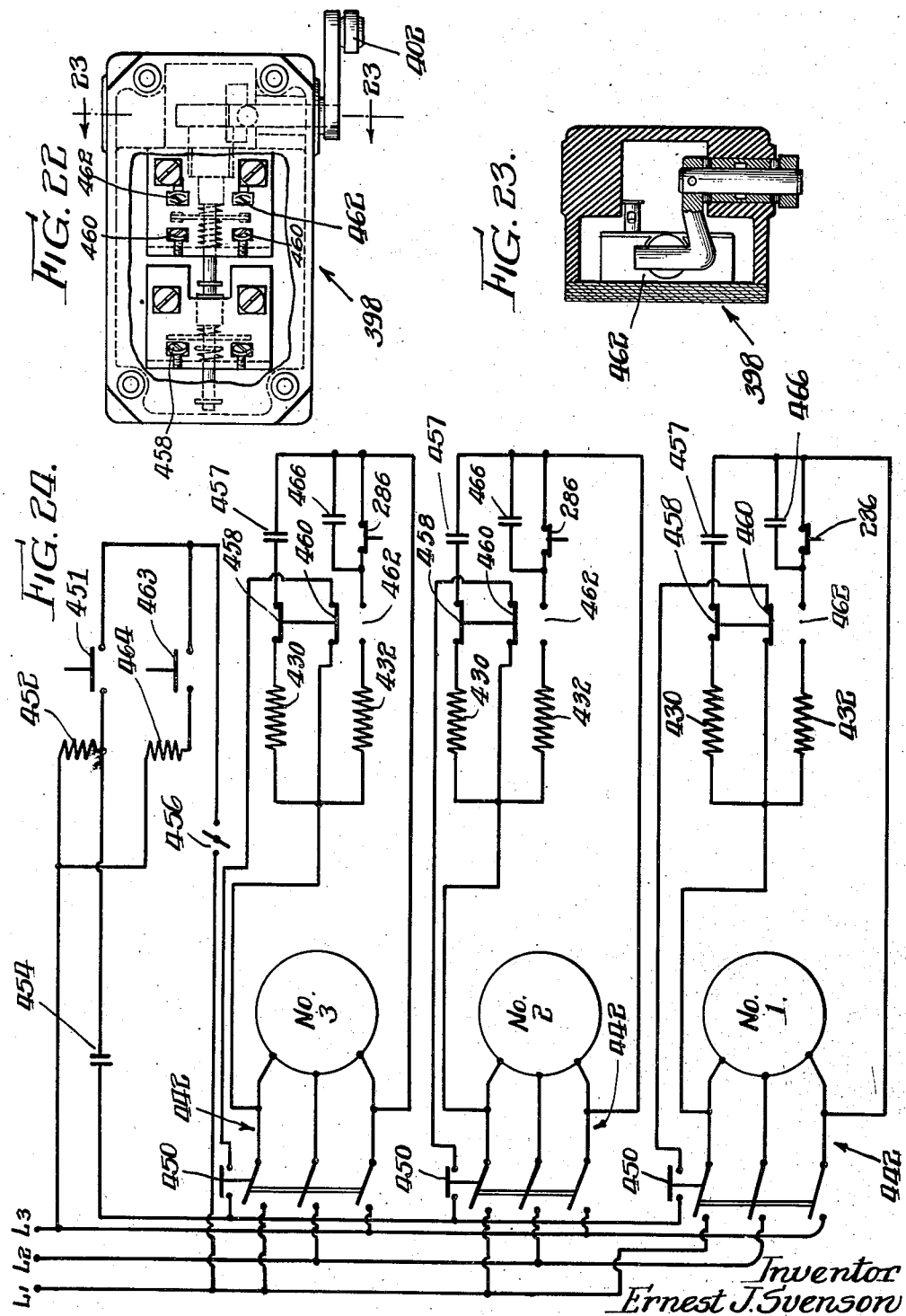

Dec. 23, 1941.　　E. J. SVENSON　　2,266,829
METALWORKING APPARATUS
Filed March 30, 1936　　12 Sheets-Sheet 10
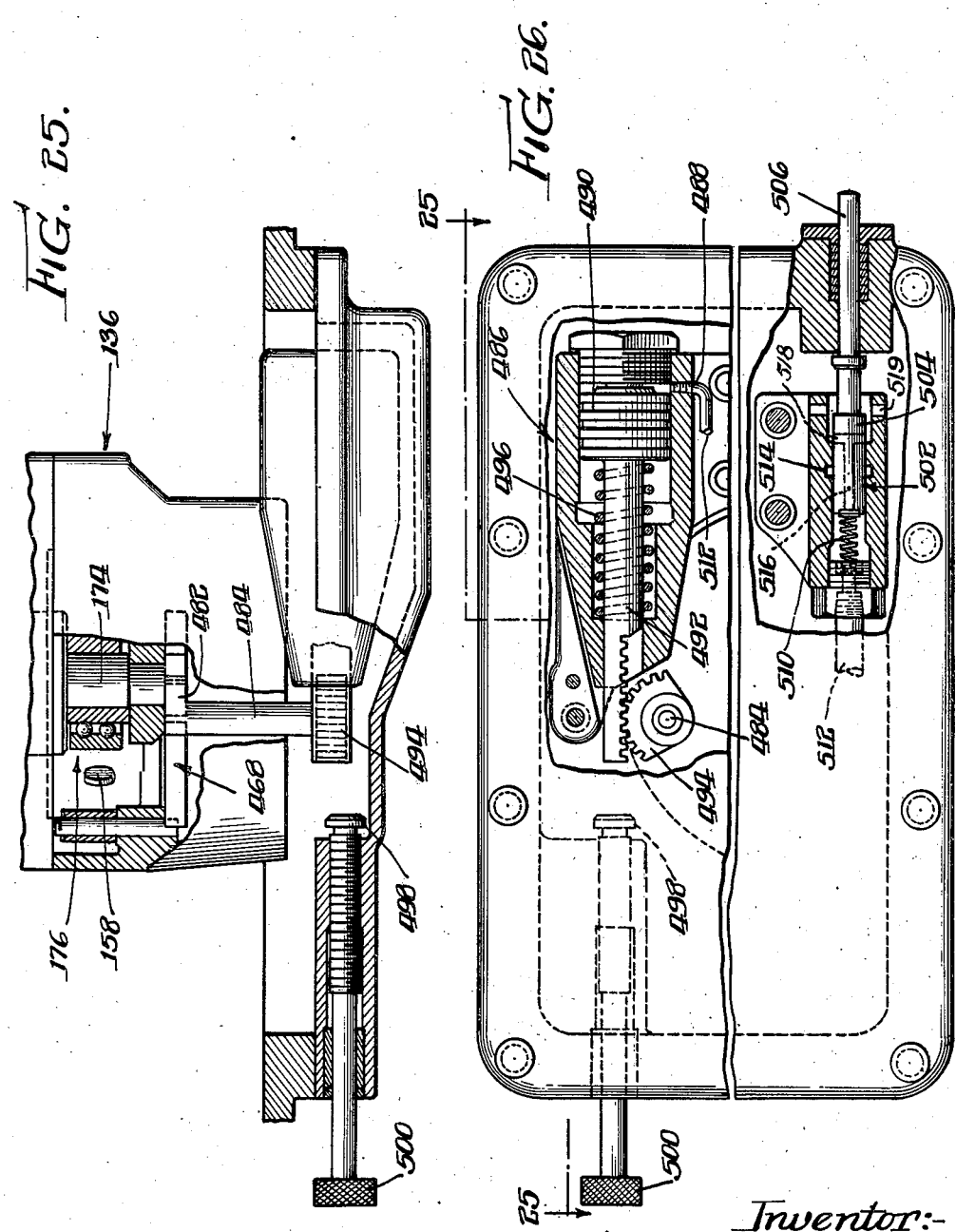
Inventor:-
Ernest J. Svenson
By:- Cox & Moore attys.

Dec. 23, 1941.  E. J. SVENSON  2,266,829
METALWORKING APPARATUS
Filed March 30, 1936  12 Sheets-Sheet 11
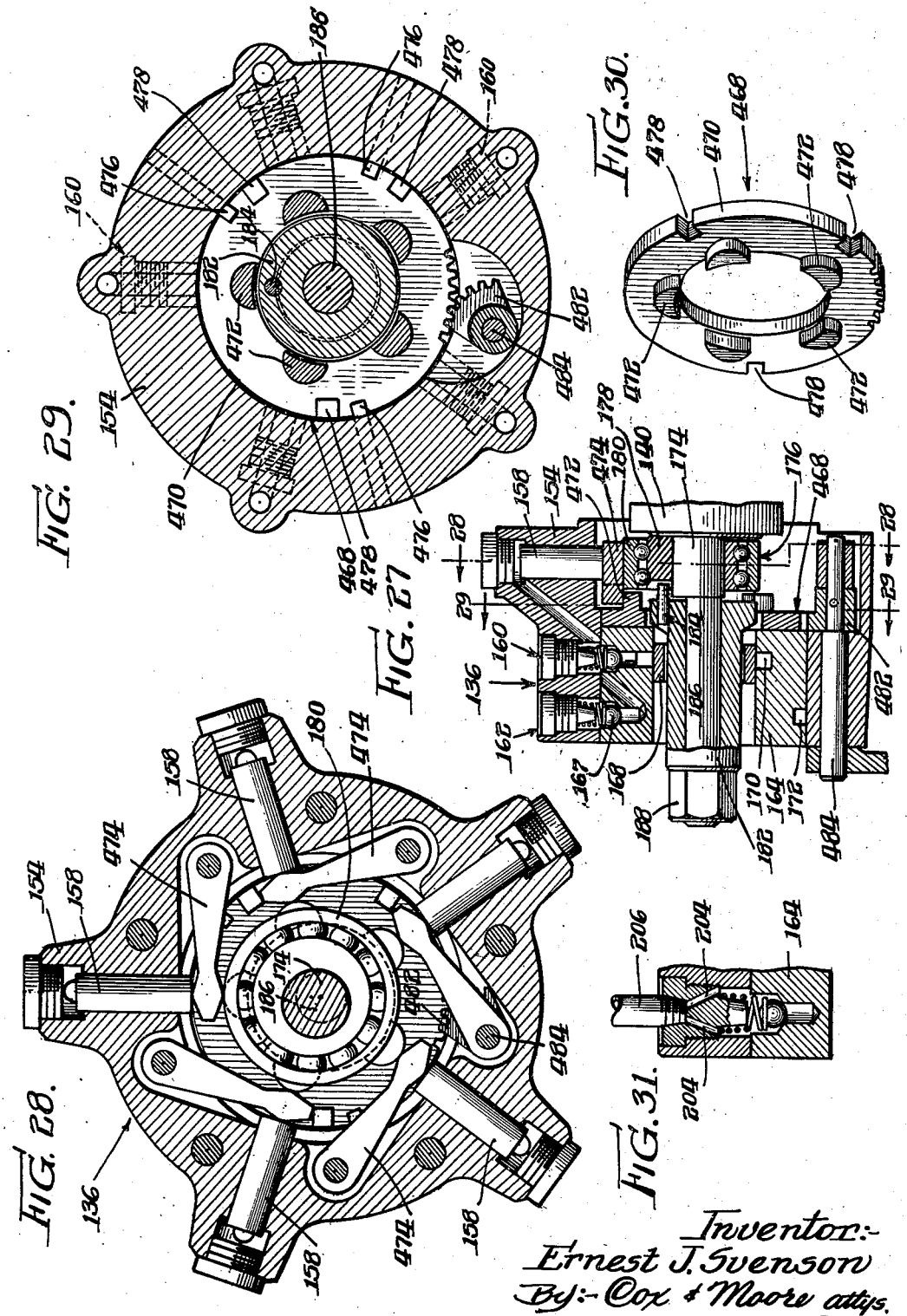
Inventor:-
Ernest J. Svenson
By:- Cox & Moore attys.

Dec. 23, 1941.  E. J. SVENSON  2,266,829
METALWORKING APPARATUS
Filed March 30, 1936  12 Sheets-Sheet 12
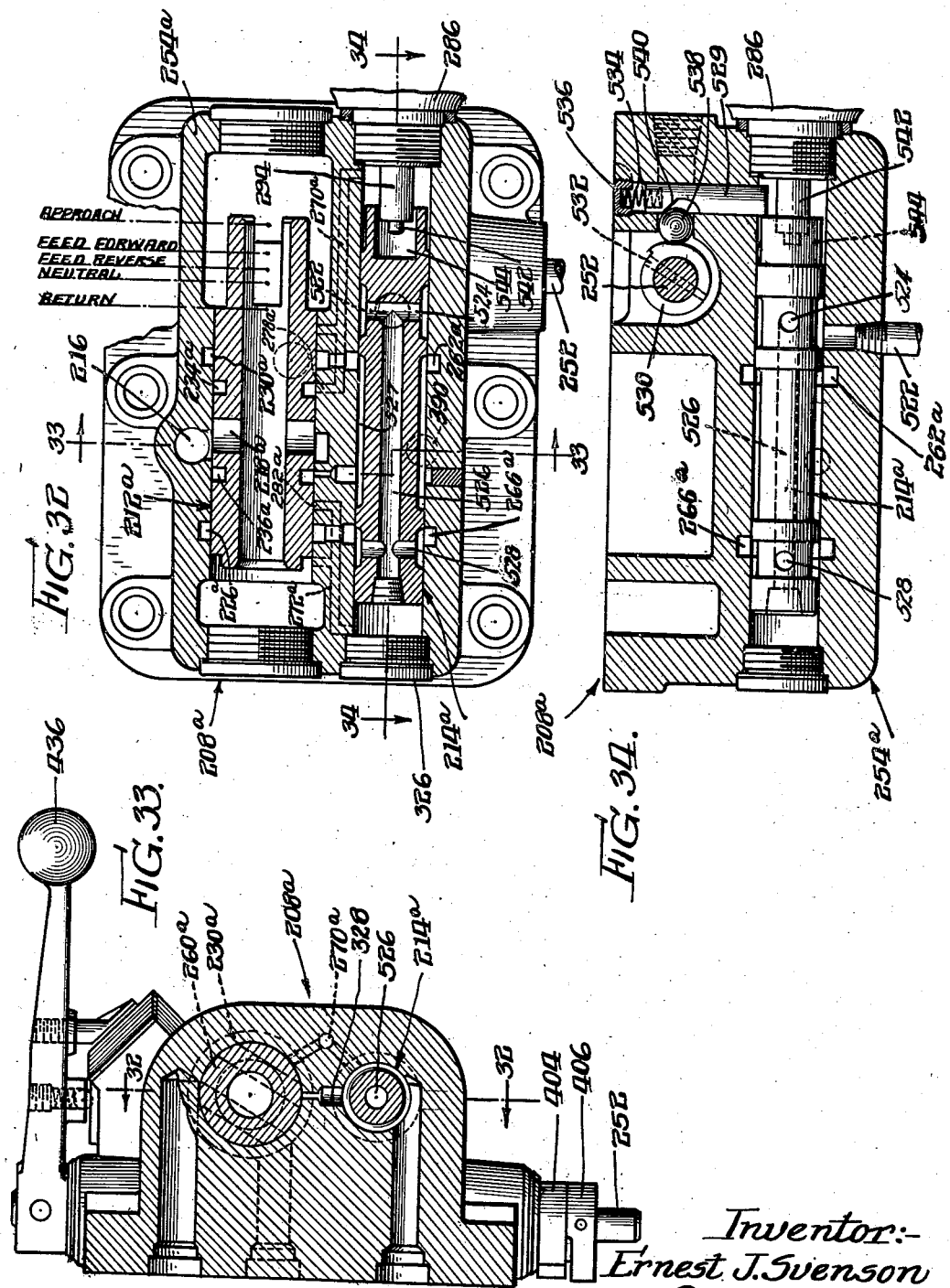
Inventor:-
Ernest J. Svenson
By:- Cox & Moore
attys Patented Dec. 23, 1941

2,266,829

UNITED STATES PATENT OFFICE 2,266,829

METALWORKING APPARATUS

Ernest J. Svenson, Rockford, Ill., assignor, by mesne assignments, to John S. Barnes Corporation, Rockford, Ill., a corporation of Delaware Application March 30, 1936, Serial No. 71,754

51 Claims. (Cl. 29—26)

My invention relates generally to metal working apparatus and to improvements in control features, said invention relating more particularly to apparatus commonly referred to as self-contained machine tool units.

I have observed that in the main production industry of the country—namely, the automotive industry—that it is common practice, in connection with the maintenance of machine tools, to group skilled workmen according to the duties they are to perform. For example, one group may be designated as electricians; another group as machine repair men; still another group as tool makers; and additional groups as hydraulic service men, fixture repair men, etc. With the view of obtaining efficiency in the maintenance of the machines, the duties of each group are limited to specific assignments, which their name indicates. It has been my observation that the operating efficiency of these groups has been seriously impaired because of the structural characteristics of the machines which they are called upon to service. In other words, the various features of the machine, such as the electrical, hydraulic, supporting fixtures, etc., are so combined in conventional machines, with which I am familiar, as to render it practically impossible for one group to function independently of the other, or stating it another way, for one group to perform its duties without encroaching upon the work of one of the other groups. I have also observed that many manufacturers, who are leaders in the field, are today compelled to rebuild machines in their own plants simply because the designers and builders of such machines did not understand the specific organization of service men in groups employed to maintain the machines in continuous running order. While each machine structure in itself constitutes a small element in a plant, a breakdown on that machine interrupts the functioning of all other machines connected therewith in the line of production. Therefore, it is of the utmost importance that machines be maintained in running order twenty-four hours a day in order to keep the plant at its maximum operating efficiency. It is therefore an important object of the present invention to so arrange a metal working apparatus—for example, a machine tool unit—that skilled workers may function in groups at maximum efficiency, and to this end I propose to provide apparatus in which the various features of construction are not only extremely simple in arrangement, but are combined in such a manner as to enable the repair, replacement, adjustment, etc., of one without disturbing or interfering with the position of another.

Another object of my invention is to provide a device, as set forth above, with a simple and positive remote control arrangement whereby the shifting of a single control element, such as a push button or the like, serves to control the functioning of several devices, such as electrical and hydraulic devices. In providing said control features, it is my aim to present a standardized combination or unit which is applicable to a great variety of machines, and which unit arrangement is not impaired by modifications of the original combination of devices or parts.

A further object of the invention is to provide an improved self-contained machine tool unit having relatively few parts, and to this end I propose to provide a unit having an improved simple durable drive which is extremely flexible in the sense of speed variation.

It is also an object of the present invention to provide improved pump drive and controls therefor, and my invention contemplates an effective variable driving means for a feed pump, which also will serve as a driving means for a rapid traverse pump.

In addition to the above mentioned objects and advantages, my invention contemplates the provision of an improved control valve arrangement and associated circuits and structures incorporating hydraulic and electrical features. It has been my observation in the field that the conventional method of controlling rapid traverse and feed mechanisms requires the use of control means for reciprocating a machine element and other control lines for governing the starting and stopping of the prime mover or electric motor. By having these separate control lines, the operator frequently forgets which control to actuate when an emergency arises. It is, therefore, an important object of the present invention to provide a control arrangement whereby an operator need only actuate a single control element to govern a plurality of actuators such as a hydraulic actuator and an electric motor.

A further object of the present invention is to provide an improved reservoir structure which will facilitate in dissipating heat generated by the moving machine parts, and which will also facilitate lubrication and counteract fluid leakage.

It is a further object of the present invention to provide an improved pump displacement control means in association with a feed pump and structures operated thereby, whereby a machine part or supporting structure may be propelled at a given feeding rate, and by a simple adjustment propel said machine part at a different feeding rate. Such an arrangement differs materially from conventional eccentric adjusting mechanism employed on variable displacement plunger pumps.

Another object of the present invention is to provide an improved reversing valve structure in association with control circuits and structures operated thereby of extremely simple design which is adapted to control the feeding movement of a machine element in opposite directions.

My invention also contemplates an improved electrical circuit arrangement particularly adapted for the control of machine tools, wherein the usual duplication of wires and control devices is eliminated.

Numerous other objects and advantages will be more apparent from the following detailed description when considered in connection with the accompanying drawings, wherein—

Figure 1 is an elevational view of a self-contained machine tool unit embodying features of my invention, said unit being of the slidable type mounted upon a main frame or base;

Figure 2 is an end elevational view taken from the left of Figure 1;

Figure 3 is an enlarged central sectional view of the main drive shaft and associated parts;

Figure 4 is a transverse sectional view of the drive shaft and associated parts taken substantially along the line 4—4 of Figure 3;

Figure 5 is a fragmentary plan view of the reservoir structure and fluid channels associated therewith, said reservoir being positioned immediately beneath the electric prime mover shown in Figures 1 and 3;

Figure 6 is an enlarged central sectional view of a lubricating mechanism or pump, said view being taken substantially along the line 6—6 of Figure 5;

Figure 7 is an enlarged central sectional view of a safety valve arrangement, said view being taken substantially along the line 7—7 of Figure 5;

Figure 8 is a semi-diagrammatic disclosure of the sliding head and fluid circuits supported thereby;

Figure 9 is an enlarged elevational view of the main control valve;

Figure 10 is a transverse sectional view of the control valve taken substantially along the line 10—10 of Figure 9, the control handle and dogs being detached from the vertical valve shaft;

Figure 11 is an enlarged fragmentary sectional view of the main control valve taken substantially along the line 11—11 of Figure 9;

Figure 12 is a vertical sectional view of the main control valve mechanism taken substantially along the line 12—12 of Figure 10;

Figure 13 is a fragmentary transverse sectional view taken substantially along the line 13—13 of Figure 12;

Figure 14 is an enlarged fragmentary view (shown partly in section) of the contactor mechanism mounted within the main control valve housing;

Figure 15 is an enlarged fragmentary elevational view of the self-contained actuator unit or head frame structure equipped with mechanisms employed to control said head frame, in timed and interlocked relation with the movements of other head frames, as indicated in Figure 20;

Figure 16 is a fragmentary plan view of the control dogs associated with each head frame structure;

Figure 17 is a detailed elevational view of the two-direction magnetic actuator shown in Figure 15;

Figure 18 is a fragmentary transverse sectional view taken along the line 18—18 of Figure 17;

Figure 19 is a central longitudinal sectional view of a modified magnetic actuator;

Figure 20 is an elevational view of a machine tool arrangement with a plurality of self-contained machine tool units, the electrical circuit arrangement being partially disclosed;

Figure 21 is an enlarged elevational view of the electric control panel;

Figure 22 is an elevational view of a limit switch associated with each head frame structure;

Figure 23 is a transverse sectional view taken substantially along the line 23—23 of Figure 22;

Figure 24 discloses the electric circuit diagram employed when a plurality of units are to be automatically controlled from a single remote control station as shown in Figure 20;

Figure 25 is an elevational view (shown partly in section) of mechanism for controlling the feed pump displacement, said view being taken substantially along the line 25—25 of Figure 26;

Figure 26 is a front elevational view of the displacement control device shown in Figure 25, a portion of the housing thereof being broken away to disclose parts otherwise hidden;

Figure 27 is a feed pump mechanism similar to the pump mechanism disclosed in Figure 4 with an auxiliary mechanism to facilitate variation in feeding rates;

Figure 28 is a transverse sectional view of the pump mechanism taken substantially along the line 28—28 of Figure 27;

Figure 29 is a transverse sectional view of the pump mechanism taken substantially along the line 29—29 of Figure 27;

Figure 30 is a perspective view of the control cam mechanism detached from the pump housing;

Figure 31 discloses the manner in which the discharge side of the pump shown in Figure 27 could be slightly modified so as to convert said pump into an injector mechanism adapted to be used on Diesel motors;

Figure 32 is a central vertical sectional view of a modified main control valve mechanism designed to control the feeding of a machine part in opposite directions, said view being taken substantially along the line 32—32 of Figure 33;

Figure 33 is an enlarged transverse sectional view of the modified control valve mechanism taken substantially along the line 33—33 of Figure 32; and Figure 34 is a horizontal sectional view of the modified valve mechanism taken substantially along the line 34—34 of Figure 32.

Referring now to the drawings in detail wherein I have employed like numerals to designate similar parts throughout the various views, it will be understood that the embodiment of the invention selected for purposes of disclosure includes a machine structure having a plurality of self-contained actuator or machine tool units. My invention may be understood more readily by describing various features of construction in the following order:

Mechanical and supporting structures;
Pump drive and control;
Valve structure;
Reservoir, fluid connections and lubricating arrangement;
Electrical remote control;
Standard control panel and circuit;
Statement of operation;
Displacement control mechanism; and
Valve incorporating reversible feed.

Mechanical and supporting structures

In Figures 1 and 2 I have disclosed a self-contained actuator or machine tool unit designated generally by the numeral 40, (of which several such units may be incorporated in one machine as shown in Figure 20), which is slidably mounted upon a main supporting base 42, which base provides a support for a head frame 44 of the unit 40. The head frame 44 is constructed with guideways 46, which are complementary to guides 48 provided on the upper portion of the base 42. A prime mover 50 is mounted on the head frame 44, as clearly shown in Figures 1 and 2.

The head frame 44 houses an oil reservoir 52, Figures 3 and 4. A main drive shaft 54 is mounted in the head frame on suitable anti-friction bearings 56, 58, and 60, as clearly shown in Figure 3. One extremity of the drive shaft 54 detachably supports a V-belt pulley 62 which serves as a driving means for the shaft 54. The pulley 62 receives power from the prime mover 50 through the agency of a complementary V-belt pulley 64 and a series of V-belts 66. The pulleys and belts are completely enclosed by means of a suitable housing 68.

It is absolutely essential to maintain the head frame structure as a whole at a uniform temperature, and it will be apparent that I have arranged the oil reservoir 52 in such a manner as to circulate oil to and around all rotating parts, such as bearings, gears, etc. This serves to maintain uniformity in temperature of said parts. It is common practice in devices of the type described herein to employ a plurality of drive shafts and gears, and it will be noted that I employ a single main drive shaft, and, by so doing, I have reduced the possibility of fluid leakage to a minimum. It will also be noted in Figure 1 that the head frame 44 is provided with surfaces 70, whereby any suitable spindle head such as a spindle head 72 may be secured to the head frame by means of screws 74.

A chamber or compartment 76 is provided in the head frame 44, which is separated or isolated from the oil reservoir 52, and a pump compartment 78 is provided at one extremity of the head frame. A suitable sealing device 80, which engages the inner race 82 of the bearing 58, serves to seal the compartment 76 from the compartment 78. Obviously other commercial sealing structures may be used, if desired. A similar sealing arrangement 84 is associated with the bearing 60 and functions particularly when the unit 40 occupies a vertical position—for example, the vertically positioned unit 40c shown in Figure 20. A cover 86, coupled with a suitable gasket 88, absolutely prevents leakage of oil.

The main drive shaft 54 is secured against axial movement by the bearing 60, which bearing is secured in place by a retainer 90 fastened to the head frame by suitable screws 92. A threaded member 94 serves to maintain the inner race of the bearing 58 against a shoulder 96, and interposed between the bearings 58 and 60 is a gear 98 and spacing collar 100 (Figure 3). The right extremity of the main drive shaft 54 has a suitable spline connection 102 with a pickoff gear 104, said pickoff gear being held in place by a screw 106. Another pickoff gear 108 meshes with the gear 104 and is mounted upon a spindle driving shaft 110. Tool supporting spindles 112 are drivingly coupled in a suitable manner with the spindle drive shaft 110. The pickoff gears 104 and 108 are easily removable, and hence may be conveniently exchanged for another set or merely reversed in position to obtain the desired spindle speed.

To actuate the head frame 44, I provide a fluid motor 114 (Figure 1) which is secured to the underside of the head frame and includes a cylinder 116, a piston 118, and a piston rod 120. The piston rod 120 is adjustably secured to a bracket 122 by means of adjusting nuts 124 and 126, said bracket 122 being secured to the main supporting base 42. End bracket members 128 and 130 are secured to the cylinder 116 and also to the underside of the head frame by screws 132.

In Figure 4 I have disclosed the manner in which a rapid traverse pump 134 and a feed pump 136 are mounted within the head frame 44. As previously stated, the main drive shaft 54 carries the gear 98, and this gear meshes with a companion gear 138, which is keyed to a pump variator drive shaft 140. The gears 98 and 138 are of the type commonly known as "cone gears." As an example of these "cone gears" reference is made to the publication thereof on page 641 of the periodical American Machinist for September 27, 1933. This type of gear enables areal contact between the teeth instead of the line contact present in conventional helical gears. The gears 98 and 138 are interchangeable or may be conveniently replaced by a different set of gears to obtain the desired speed ratio. These gears 98—138, together with the main drive shaft 54 and the V-belt arrangement, provide a very flexible and simple driving connection. Ball bearings 142 and 144 serve to maintain the pump variator drive shaft 140 in axial alinement.

Pump drive and control

Having described the mechanical and supporting structures of the machine tool unit, I shall now describe the drive and control structures associated therewith. Referring to Figure 4, it will be seen that the pump variator drive shaft 140 through a spline coupling 146 is drivingly connected to a pump shaft 148 of the rapid traverse pump 134. This rapid traverse pump may be of the design disclosed in my Patents Nos. 1,912,737 and 1,912,738, and hence needs no further explanation than to state that the pumps disclosed in said patents are of the gear pump variety, and are particularly adapted for continuous operation without increasing to any appreciable extent the temperature of the oil.

An auxiliary pump 150 is driven directly from the rapid traverse pump 134 and is employed for the purpose of maintaining a predetermined oil level within the pump compartment 78 at a height which is indicated in Figure 4. To this end oil is drawn through a channel 152 connected with the intake side of the auxiliary pump 150, said pump discharging directly into the fluid reservoir 52.

The feed pump 136 is of a construction similar to the pump disclosed in my copending application Serial No. 684,677, Patent No. 2,215,257, and consists of a pump body or housing 154 suitably secured to the head frame casting at 156 (Figure 4), as by means of screws (not shown). The pump 136 includes a suitable number of pistons 158, five in the present embodiment, and these pistons are reciprocably mounted within the pump body 154. I provide an inlet valve assembly 160 for each piston 158, and an outlet valve assembly 162 for each of said pistons, there being five inlet and five outlet assemblies in the embodiment shown. A unitary valve housing 164 is provided with seats for ball valve members 166 and 167, as clearly shown in Figure 4. In manufacturing this structure, I found that pressing the unitary valve housing 164 into the pump housing 154 did not give satisfactory results, due to the shearing action of the pump body when the valve housing was being inserted. The absence of a tight fit presented the problem of fluid leakage. I therefore prefer to first subject the valve housing 164 to a shrinking process in "dry ice" or "liquid air," and to subject pump body 154 to expansion in a heated body of oil. I then insert the shrunken or contracted valve housing 164 into the expanded pump housing 154, and when the temperature of said parts returns to normal a very tight leakproof fit is obtained. I employ a bushing 168 to seal an intake groove 170 communicating with valves 166, an outlet groove 172 communicating with valves 167 being sealed by the pump body 154. In order to provide a variable eccentric driving mechanism for the pistons 158 having a minimum number of parts, I prefer to eccentrically machine a crank pin 174 directly on the pump variator drive shaft 148. A driving ring or bearing structure 176 includes an eccentric inner race member 178, which is mounted upon the eccentric crank pin 174. An outer race 180 and the ball bearings associated therewith are a commercial standard product, the only specially machined part being the inner race member 178. It will thus be apparent that by rotating the inner race member 178 with respect to the crank pin 174, a variation in piston stroke is obtained. To effect this relative rotation of the inner race 178 and the pin 174, I employ a sleeve 182 having a suitable coupling with the inner race 178, such as a pin and slot arrangement 184. A clamp stem 186 serves to support a clamping nut 188. To vary the stroke of the pistons 158, it is only necessary to remove a retainer cap 190, loosen the nut 188 slightly, and insert a suitable wrench so as to rotate the sleeve 182. By removing a cover plate 192 and a gasket 194, the entire pump housing 154 may be removed without disturbing the rotary driving elements, such as the eccentric driving pin and associated parts. For maintaining the pump variator drive shaft 140 in proper position, a retainer or ring 196 is employed, said retainer being secured in position by means of screws 198. A similar cover plate 200 is removable to permit the convenient detachment of said rapid traverse pump 134, it being only necessary to remove screws (not shown), which secure the pump to a flange 202.

A detailed explanation of the functioning of the feed pump 136 is not necessary, and it will suffice to state that the pressure of fluid within the intake groove 170 opens each complementary ball valve 166 in turn, and causes the companion piston 158 to follow the movement of the eccentric driving mechanism 176. When said piston reaches the limit of its downward movement, said ball valve 166 closes and fluid is discharged under pressure as the piston is urged outwardly through its associated outlet valve 167. If desired, the auxiliary pump 150 may be employed to maintain a suitable pressure in the intake groove 170.

At this point it should be understood that my invention as applied to the feed pump is not limited to a machine tool structure, inasmuch as the driving arrangement and feed pump structure 136 is designed for application to Diesel motors or the like. In Figure 31 I have disclosed the manner in which the outlet valve assembly 162 could be slightly modified by eliminating the groove 172 and providing a passage 204, which serves to direct fluid under pressure through a suitable channel or conduit 206, which may be connected with a cylinder of the Diesel motor (not shown). In other words, the ball valve mechanism just described may serve to properly inject fluid under pressure into a cylinder such as the cylinder of a conventional motor employing fuel oil, for example, motors commonly known in the trade as Diesel type motors, and the timing of said injection will be governed by the disposition of the ball valves and the rotation of the eccentric driving mechanism 176. Obviously the number of pistons will conform with the number of cylinders into which fluid is to be injected.

*Valve structure*

My invention contemplates a main valve structure designated generally by the numeral 208 (see Figures 9 to 14 inclusive), one such valve being provided for each head frame structure. This valve structure is somewhat similar to the corresponding valve mechanism disclosed in my co-pending applications, Serial No. 481,742, filed September 13, 1930, Patent No. 2,078,696, and Serial No. 627,025, filed July 30, 1932.

The valve mechanism of the present application differs materially from my other valve structures of each head frame in providing a single control arrangement for the hydraulic and electrical structures. It has heretofore been the practice in using control valves to limit said valves to the control of hydraulic circuits and to employ other control means for the electrical circuits. My invention contemplates a valve arrangement whereby the shifting of a single control handle serves to govern both the hydraulic and electrical circuits. To accomplish this I have incorporated directly within the valve housing an electrical contactor, about to be described, which functions in response to the shifting of the main control valve.

Each control valve 208 is adapted to be secured to its associated head frame 44, as clearly shown in Figure 1. Fluid connections or couplings 210, in Figure 5, specifically described and claimed in my co-pending application, Serial No. 56,935, filed December 31, 1935, connect the conduits of the hydraulic system to the control valve and thus absolutely preclude fluid leakage at this point. The control valve 208 comprises two shiftable valve members or pistons 212 and 214 which cooperate in variously directing fluid to the actuator 114 from the rapid traverse pump 134 and the feed pump 136 as may be best understood by reference to Figure 8. The valve piston 212 controls the fluid from the rapid traverse pump, and the valve piston 214 controls the fluid from the feed pump. Valve piston 212 is shifted by means of an operating shaft 252 (Figure 10) operated by control mechanism later to be described. The valve piston 214 is shifted hydraulically by means of and in accordance with the movements of the valve piston 212. The valve piston 212 has essentially four operating positions, neutral, feeding, rapid approach or rapid traverse in the approach direction, and rapid reverse or rapid traverse in the reverse direction. The valve piston 214 has two positions of operation, neutral or circulating position, and feed position. When the valve 212 is in neutral position, the port 236 thereof is alined with a passageway or port 282. When the valve is in feeding position, port 234 is alined with passageway or port 278. When the valve is in rapid approach position, the port 234 is alined with the valve port 230, and when the valve is in rapid reverse position, the port 236 thereof is alined with port 226. The function of these several ports will be later described. The feed pump valve 214 is shown in its feed position in Figure 12 wherein the port 262 is blocked by the valve head 215. When the valve is shifted to the right it is in its neutral or circulating position, and in this position the port 266 is closed by the valve head 217.

Referring further to Figure 12, it will be seen that a port 216 communicating with the valve piston 212 receives fluid from the rapid traverse pump 134, by means of a conduit 386 (Figure 8), and when the valve piston is in its neutral or feeding positions, this fluid is allowed to circulate through the port 218 and a restricted orifice arrangement 220 into the exhaust valve chambers 222 and 224 which discharge into the reservoir 52. Accordingly with the valve in neutral or feeding position, fluid from the rapid traverse pump is inoperative to shift the actuator 114.

As will be best understood by reference to Figure 13, the valve ports 234 and 236 are in constant communication with the inlet port 216 by means of flats or channels 242 and 244 formed on the body of the valve 212. To effect rapid approach of the fluid motor 114, the valve 212 is shifted, as previously stated, so as to aline the port 234 thereof with the port 230 formed in the valve body 254. The port 230 is in constant communication with a channel or conduit 232 (Figure 8), leading to one end of the actuator 114. Accordingly when the valve 212 is in this position, fluid will be transmitted from the rapid traverse pump to the actuator 114 to effect the shifting thereof. Fluid is returned from the other end of the actuator through a channel or conduit 228 which is connected to the port 226, the port 226 being free to communicate with the exhaust chamber 224 in this position of the valve, inasmuch as the end of the valve has been moved to the right of the port 226 as seen in Figure 12.

To effect rapid reverse, or rapid traverse of the actuator in the opposite direction, the valve 212 is shifted, as previously stated, to aline the port 236 thereof with the port 226 in the valve housing 254. In this position of the parts fluid is directed by the valve 212 from the rapid traverse pump through ports 236 and 226 and conduit 228 to one end of the actuator 114. The return fluid from the actuator is transmitted through conduit 232 into port 230, and then into the exhaust valve chamber 222, the port 230 being in free communication with chamber 222 when the valve has been shifted to the left as seen in Figure 12, to aline the ports 236 and 226.

End caps 238 and 240 serve as retainers or closures for the exhaust chambers 222 and 224 and also as stops for the valve member 212 in its movement in both directions.

The valve structure is so arranged that substantially no fluid pressure exists within the chambers 222 and 224, inasmuch as these chambers communicate directly with the reservoir 52, but suitable low pressure exists within the valve ports 216, 234 and 236 even when the valve 212 is in neutral or feeding position, due to the orifice arrangement 220. In order to vary the size of the orifice when the displacement of the rapid traverse pump is increased or decreased, for example to conform the orifice to the particular size of pump being used, a nozzle arrangement 246 is provided, said nozzle being threaded into the valve member 212 as indicated at 248. The nozzle 246 is provided with a passageway 250, (Figures 12 and 13). When the nozzle is in the position shown, the passageway 250 is relatively unrestricted. By rotating the nozzle 246, the passageway 250 may be moved toward a horizontal position whereby to restrict it any desired amount.

As previously stated, the valve member 212 is shifted either manually or automatically by the shaft 252 (Figure 10). This shaft is rotatably mounted within the valve housing 254, suitable packing 256 being provided to preclude leakage. A lever 258 connects the shaft 252 with the valve member or piston 212 through the agency of a pin 260 so that the rotation of the shaft 252 in one direction or the other, by means later to be described, causes movement of the valve piston 212.

Referring now to the valve piston 214 which serves to control fluid from the high pressure or feed pump 136, it will be seen that a pair of ports 262 and 266 in alinement with ports 230 and 226 respectively are provided. Port 262 communicates with port 230 and its associated and connected conduit 232 by means of a channel 264, and port 266 communicates with the port 226 and its connected conduit 228 by means of a channel 268. As best seen in Figure 8, the conduit 232 is connected to the exhaust conduit 388 leading from the feed pump, and an inlet or return conduit 390 leads from the valve 214 back to the inlet side of the pump.

When the valve piston 214 is in its feeding position, as shown in Figure 12, high pressure fluid will be directed from the feed pump 136 through the conduit 388 and the lower end 232a (Figure 8) of the conduit 232 to the actuator 114. Fluid is prevented from passing upwardly through conduit 232 into the valve 208 due to the fact that the head member 215 on the valve 214 at this time blocks the port 262, and the port 230 is also blocked by the valve 212, the valve 212 being at this time in its feeding position. An approach feeding movement of the actuator is thus effected. Fluid is returned from the actuator through the conduit 228, port 266 which is at this time open and the return line 390 back to the pump, the port 266 and the return line 390 being at this time in communication as seen in Figure 12.

When the valve member 214 is shifted to the right as seen in Figure 12 to its neutral or circulating position, the piston head 215 shifts to the right opening port 262, and piston head 217 shifts to the right closing port 266. Under these conditions fluid circulates from the feed pump through conduit 388, the upper portion of conduit 232, port 262 and return line 390 back to said pump, the port 262 and the line 390 at this time being in communication. With the valve 214 in neutral position therefore the fluid from the feed pump is merely circulated idly in a closed circuit. It is to be understood that fluid passes from the port 262 or the port 266 to the return line 390 along the body of the valve member 214 under the conditions of operation above described.

To preclude leakage, there are no exterior operating connections to the valve piston 214, such being rendered unnecessary because the valve piston 212 functions to control the shifting of the valve 214 in one direction or the other hydraulically by directing fluid pressure either to one end or the other of the valve piston 214, by means now to be described. To more clearly illustrate this arrangement, I have shown in dotted lines in Figure 12, see also Figure 9, a longitudinal channel 270 at the right of the valve casing 254, and the corresponding channel 272 at the left of said valve casing. Cross channels 274 and 276 connect with said longitudinal channel 270 and the bore of the casing within which the valve 214 is movable, and additional cross channels 278 and 280 connect the longitudinal channel 270 with the bore of the casing in which the valve 212 is movable. In a similar manner cross channels 282 and 284 connect the longitudinal channel 272 with the casing bore for the valve 212, and the cross channel 285 serves to connect the channel 272 with the left extremity of the bore within which valve 214 is movable.

When the valve piston 212 occupies its feeding position, port 234 will be alined with channel 278 causing the introduction of pressure fluid to the right end of the valve piston 214 through channels 278, 270, 274 and 276, thereby causing the shifting of the same to the left into its feeding position. Upon the shifting of the valve, fluid at the opposite or left end thereof is returned through channels 285, 272 and 284 into the exhaust chamber 224, the channel 284 being at this time in free communication with said chamber. Similarly when the valve piston 212 is shifted to its rapid approach position, alining port 234 with port 230, fluid pressure is also transmitted to the channel 278, due to the flats or channels 242 and 244 (Figure 13), previously referred to. It will thus be seen that the valve 214 is shifted to its feed position when the valve 212 is shifted either to its feed or rapid approach positions.

When the valve member 212 is shifted to its neutral position, to aline the port 236 with the channel 282, fluid is directed through channels 282, 272 and 285 to the left end of valve piston 214, causing the shifting of the same to its right or neutral circulating position. During the shifting of the valve 214, fluid passes from the chamber at the right end thereof through the channels 274 and 276, as will be later described, channel 270, and channel 280 which is at this time in free communication with the exhaust chamber 222. Similarly upon the shifting of the valve 212 to its rapid reverse position, wherein port 236 is alined with port 228, due to the ports 242 and 244 (Figure 13), fluid will similarly be directed through the channels as described to move the valve 214 to the right. Accordingly it will be seen that the valve 214 is shifted to its neutral position when the valve 212 is shifted to its neutral or rapid reverse positions.

An electrical contactor 286 is secured to the valve housing 254 by means of a threaded coupling 288 and suitable gaskets at 290 and 292. A piston 294 is reciprocably mounted within the contactor body 296 and abuts against a sealing diaphragm 298, which is normally urged to the left (Figures 12 and 14) by a spring 300. When the valve piston 214 engages the piston 294 as it is shifted to the right, the latter is urged outwardly against the spring 300, causing a contact 302 (Figure 14) to close a connection between a contact 304 and another contact 306, thereby electrically connecting a wire terminal 308 in a circuit with a companion wire terminal 310. The closing of this circuit forms part of the control means for shifting valve 212, and more specifically causes the shifting thereof to its rapid reverse position, as will be later described.

By loosening a screw 312, the wire terminals 308 and 310 may be rotated about the axis of the piston 294 to any desired position. To prevent fluid pressure from acting upon the diaphragm 298, a channel 314 in the valve body 254 leading to chamber 222 is employed. Further, a spring 316 serves to resiliently retain contact 302 in proper contact with the contact members 304 and 306.

In many instances it is desirable to have a slight dwell of the head frame 44 before reversal thereof takes place. This is accomplished by restricting the channel 274, as shown in Figure 11, whereby to delay the shifting of valve 214 to the right to close contacts 304 and 306. A needle valve 212 to its rapid reverse position. A needle valve 318 is adjustably positioned to increase or decrease the speed of fluid passing through the cross channel 274. Therefore, when the valve piston 214 is actuated to the right, it experiences rapid movement until a forward portion 320 of said piston blocks the unrestricted cross channel 276. This causes the speed of travel of the piston to be materially reduced as restricted channel 274 becomes the only channel of fluid escape until a groove 322 connects with the cross channel 276, which through two longitudinal channels 324 again permits fluid to pass through unrestricted channel 276. This enables a sudden snap action to take place as the valve member 214 shifts the piston 294 of the electrical actuator 286. In other words, it causes a snap action to be experienced by the contact 302 when it makes contact with the contact members 304 and 306.

Likewise, when the valve piston 214 is shifted in the opposite direction, the restriction through the cross channel 274 provides a dash pot action, and thus eliminates hammering action which might otherwise take place between the valve member 214 and an end cap 326.

As previously brought out, the fluid to and from the feed pump 136 circulates in a closed circuit, both when the pump is operatively propelling the actuator 114 at feeding speed and when the pump is merely circulating idly due to the neutral positioning of the valve 114. However, due to the presence of piston rod 120 on one side of the actuator piston 118 and the absence of the piston rod on the other side thereof, or due to other features, a difference may exist in the volumetric requirements on the inlet and outlet sides of the actuator during its feeding movement. These differences, and leakage which might occur, are compensated for by an orifice 328 (Figure 12) which leads from the port 236 into the bore of the valve casing within which the valve 214 is movable. This orifice which thus leads from the exhaust side of the rapid traverse pump into the closed circuit for the feed pump, automatically functions to maintain proper pressure conditions within the inlet groove 170 (Figure 4) of the feed pump.

From the above description it will be apparent that the valve mechanism 208 is capable of directing one source of fluid to the actuator in one direction or another, and another source of fluid to the actuator at least in one direction; further, that the fluid flow from one of the pumps is controlled in response to the fluid flow from the other pump, and that an electrical contactor is incorporated in the valve structure and is adapted to make a snap contact in response to fluid power from one of the pumps. It will also be apparent that said valve structure incorporates a dwell arrangement whereby both pumps may circulate at no pressure, thereby stopping the actuator at a predetermined time before contact is established by the electrical contactor. The function of the contactor 286 will be more apparent when the electrical and remote control arrangement is described.

Reservoir, fluid connections and lubricating arrangement

In Figure 5 I have shown a plan view of the fluid reservoir 52 with the upper structure, such as the prime mover 50 and associated parts, removed to more clearly illustrate the arrangement of the various channels or conduits which are positioned within said reservoir. I have observed difficulties in maintaining externally positioned fluid channels free from leakage and to overcome this difficulty I propose to locate all of the channels within the fluid reservoir 52. I have found it practical to employ a safety valve arrangement secured as a unit within the reservoir casting. Heretofore it has been the common practice to machine a portion of the fluid reservoir casting to serve as a housing for safety valves, but this has not proven satisfactory, due to the presence of leakage. Furthermore, such an arrangement does not make for compactness in construction and is relatively difficult and costly to machine. In Figure 7 I have disclosed a unit safety valve mechanism, designated generally by the numeral 330, which consists of a main body 332, a secondary body 334, a safety valve piston 336, pressure controlling spring 338, and an adjustment screw 340. A leakage cap 342 and gasket 343 seal the valve against leakage, and a threaded section 344 is incorporated to secure the valve mechanism directly to the reservoir casting. The valve just described is connected through line 232 to the high pressure line 388 and is brought into play under abnormal pressure conditions during the feeding stroke.

Another and similarly constructed valve mechanism 346 (Figure 5) is connected to the rapid traverse line 386 through a fluid connection 348. Thus the valve mechanism 330 provides a safety device during the feeding movement when high pressure is established, and the valve mechanism 346 provides a safety device which will operate under lower pressures during the rapid traverse movement.

It has been my experience that many of the machine "break downs" are due to inadequately lubricating the guide ways and like structures. I propose to overcome this difficulty by incorporating a lubricating arrangement which is positively and accurately controlled in response to the actuation of the machine structure. It has heretofore been common practice to incorporate an independent or auxiliary fluid pressure producing means, such as a pump, for delivering lubricant to desired points. Such auxiliary pumps necessarily require additional expense and due to competition in the field relatively inexpensive and consequently inferior quality pumps are used. I provide a pump mechanism, designated generally by the numeral 350 (Figures 5 and 6). This lubricating pump mechanism 350 includes a body 352 which supports a reciprocable piston 354. A spring 356 serves to maintain the piston 354 against a stop 358. A coupling 360 at the lower end of the body 352 is connected, through a fluid channel 362, with the fluid channel 386. Each time the pressure is raised in the fluid channel 386 as the actuator 114 begins an operative stroke an impulse is imparted to the piston 354. Inasmuch as the head frame structure 44 is continuously moved in opposite directions, a relatively high pressure is periodically established in the fluid channel 362, thereby causing movement of the piston 354 during the approach and reverse movements of the head frame. It will also be noted that the pump body 352 is submerged within the reservoir 52 and that a cross channel 366 communicates with a chamber 368 through a restricted passage 370. The size of the restricted passage 370 is adjustable through the agency of a needle valve 372. Felt or other suitable means 374 is incorporated within a groove provided in the body 352 and a wire screen 376 retains the felt in proper position.

In order to maintain pressure in lubricating lines 378 and 380 leading from the lubrication pump outlet 381, a check valve arrangement 382 is incorporated and this check valve permits a governed amount of fluid to enter when the piston 354 is actuated. As soon as the piston is reversed through the action of the spring 356, said check valve closes. Therefore a certain amount of pressure is always maintained in the lubricating lines 378 and 380 inasmuch as the various lubrication outlets 384 also comprise pressure operated check valve devices. From the foregoing it will be apparent that the piston 354 is rapidly shifted inwardly when fluid pressure in the channel 386 increases during the rapid traverse movement until stopped by an abutment 357. The amount of fluid passing through the check valve 382 on such operation depends upon the position of the needle valve 372. In other words, if the restriction set up by the needle valve 372 is relatively ineffective, a large amount of fluid passes back to the reservoir 52 through channel 366, whereas if the restriction set up by the valve is rendered effective, the major portion of the fluid is forced, through the action of the piston 354, through the lubricating lines and is thus directed to the guide ways and other selected points of the machine.

It will therefore be apparent that my improved lubricating pump mechanism 350 eliminates the difficulties heretofore experienced in the provision of auxiliary pumping devices and is extremely simple in construction. Furthermore, by having the pump 350 operated by fluid pressure which is always available during the operation of the machine, I avoid the necessity of additional pump driving mechanisms. By having the pump 350 housed within the reservoir in the manner shown, the problem of leakage is completely obviated.

Electrical remote control

Referring to Figure 20 it will be seen that my invention contemplates the use of a plurality of slidable machine tool units each having pump, actuator and control valve mechanism as previously disclosed, which units I have designated as 40a, 40b and 40c. The units 40a and 40b are adapted for horizontal reciprocation upon the base 42 and the unit 40c is vertically reciprocable upon a suitable support (not shown). These heads must be shifted toward and away from a work supporting fixture 392, indicated by dot and dash lines in Figure 20, in proper timed relation, and the timed functioning of these devices will be more apparent from the description of the electric circuit which is to follow. The electrical contactor 286 for each unit, as previously described, is secured to the main control valve housing 254 for such unit, and said valve housing is secured directly to its associated head frame structure. A stationary control bar 394 (Figures 15 and 16) for each unit is secured to the base 42 in any suitable manner, and this bar serves as a support for a plurality of control dogs about to be described. A control dog 396 serves to actuate an electrical contactor 398, (Figures 15, 16, 22 and 23) said control dog 396 being provided with specially shaped contact faces 400 adapted to engage a roller 402. The engagement of roller 402 shifts various contacts housed within the contactor in a manner presently to be described.

An upper control cam 404 and a lower control cam 406 secured to the shaft 252 (see Figure 9) serve to shift the valve piston 212 in one direction or the other when engaged by control dogs 408, 410 and 412. In Figure 16 the shaft 252 and its associated cams are shown in three different operative positions which they assume in the movement of the head frame. The shaft is shown at 252 in the position which it assumes when the head frame is in restored or home position. It is shown at 252a in its position at the beginning of the feeding movement of the head, after its rapid approach, and at 252b in the position assumed at the end of the feeding operation, at which time the head begins its rapid reverse movement. The control dog 412 engages the upper control cam 404 through the agency of a positive abutment member 414, and a resilient abutment member 416. The abutment member 416 is adjustable by means of a suitable nut 418 and spring 420 and serves to actuate the control cam 404 through a greater distance than that imparted by the abutment member 414. This arrangement insures the complete shifting of the valve 212 to neutral as the head frame is restored to home position. By means of the various control dogs 408, 410, 414 and 416, the valve control shaft 252 is shifted to its various operating positions during the cycle of movement of the head frame, as will be later described. To enable the remote control of the heads 40a, 40b and 40c, as shown in Figure 20, I prefer to employ a two-direction magnetic actuator 422 (Figures 15 and 17), one for each head, which consists of a power transmitting member 424 having a positive stop 426 at one extremity and a positive stop 428 at the opposite extremity whereby to decrease current requirements and to eliminate the possibility of hammering action which might otherwise be experienced. Actuator 422 is operatively connected by a crank 438 to valve shaft 252 as shown in Figure 18. A manual control handle 436 is also connected to the assembly. A magnetic coil 430 shifts the power transmitting member 424 in one direction to shift valve 212 for effecting the forward travel of the head frame, and a similar coil 432 shifts the member 424 in the opposite direction to shift valve 212 to effect reverse movement of the head frame. A suitable bracket 434 serves as a support for the magnetic actuator 422. This arrangement enables free movement of the power transmitting member 424 and positively precludes any binding or the like. I have found that if the power transmitting member 424 is positively connected to another member, such as the manual control handle 436, a binding of the member 424 is likely to occur. Therefore I have provided a loose or free connection between the power transmitting member 424 and said control handle 436. By mounting the power transmitting member 424 in the manner described I am able to obtain the benefit of the vibratory action to which said member is subjected by the action of the magnetic coils 430 and 432. Such vibratory action materially decreases the power which is required to shift the member 424. In fact, I have found that by mounting the member 424 as described it requires only three to four pounds pressure to shift the valve piston 212 through the slotted crank member 438, the shaft 252, and the associated connecting elements. On the other hand, if the magnetic actuator is rendered ineffective and a force exerted against the crank arm 438, a considerable increase in starting power is required to shift the valve piston 212. I have found that the friction which resists the initial actuation of the valve requires up to two and one-half times the amount of power available in the magnetic actuator. From the foregoing it will be apparent that the use of the power transmitting member 424 in combination with the magnetic coils 430 and 432 provides a very efficient means for shifting the valve piston 212.

Standard control panel and circuit

I have thus far described the hydraulic control for the machine tool units and have made reference to certain of the electrical control devices associated therewith. I shall now describe in more detail the electrical circuit arrangement which cooperates with the hydraulic circuit arrangement in controlling the timed functioning of the slidable heads. Referring to Figures 20 and 21, it will be observed that I provide a rigid, simple, main control panel, designated generally by the numeral 440, which may be secured in a position most convenient to the operator. In Figure 20, wherein I have shown a plurality of self-contained actuator units, the control panel is conveniently mounted on the base 42 directly beneath the left head 40a. This single control panel controls all three heads. The work holding or supporting device 392 may also be arranged to facilitate any specific shape and design of working pieces. I have shown electric power lines L—1, L—2 and L—3 connected through suitable magnetic controllers 442 to the prime movers of each head, only one magnetic controller being shown and said prime movers being indicated diagrammatically and designated as numbers 1, 2 and 3. A number of push buttons 444, 446 and 448 are employed, each of said buttons being companion to one of the prime movers. For purposes of clearness the buttons 444 in Figure 21 are designated by No. 1, the buttons 446 by No. 2, and the buttons 448 by No. 3, to indicate the prime movers or motors which these buttons control. The arrangement is such that the upper button in each instance initiates operation of its associated motor, and the lower button stops the operation thereof. This action is effected by closing and opening the corresponding magnetic controllers 442 by suitable button operated magnets, and inasmuch as such controls are conventional, the specific electrical control circuit for these operations has not been illustrated.

Experience has shown that conventional push buttons are not sufficiently rugged in construction to withstand the severe operating conditions in the field and are not sufficiently sealed to prevent iron dust and the like from entering the various contacting points. Therefore I propose to arrange within the bed 42 a suitable compartment and to employ the necessary sealing arrangement to prevent the collection of iron dust and the like.

It will be seen that two heavy-duty push buttons 451 and 463 marked "Start" and "Reverse" are incorporated for the purpose of hydraulically shifting the individual machine tool units or any number of units as a group, the shifting of each unit being dependent on whether the prime mover for such unit is in operation. More specifically if the push button 444 is manipulated to close the magnetic controller 442 and thereby energize No. 1, the "Start" and "Reverse" push buttons will then remotely control the machine tool unit or head 40a. Likewise by manipulating either the buttons 446 or 448 the heads 40b and 40c, respectively, may be remotely controlled through the agency of the "Start" and "Reverse" buttons. If all of the groups of buttons 444, 446 and 448 are manipulated for energizing their respective motors, all of the heads 40a, 40b and 40c may be controlled in unison by the "Start" and "Reverse" buttons. This arrangement is extremely simple and provides a control which is readily understandable by any operator. It is well known that many cutting tools can not withstand the stopping of the prime mover without causing the cutting edge to break. Therefore I aim to so construct the control arrangement that the operator may, if some unforeseen emergency arises, merely reverse all of the heads together and thereby preserve the cutting tools. It is for this purpose that the "Reverse" button is provided, as will later be described.

In Figure 24 I have diagrammatically illustrated the preferred wiring arrangement to be used for the remote control just referred to. As previously stated, my aim is to eliminate the usual duplication of wires and control devices and to so interlock the various devices as to greatly enhance the simplicity of control. It will be seen that the main power lines L—1, L—2 and L—3 are selectively connected to the various motors No. 1, No. 2 and No. 3 through the magnetic controllers 442 adapted to be operated by the push buttons 444, 446 and 448 as previously described. These controllers and their usual associated holding circuits, are of commercial design and well known to those skilled in the art and hence need no further description.

The control circuit illustrated in Figure 18 for controlling the hydraulic shifting of the several head frame structures will now be described. As previously stated, the magnetic coil 430 of each magnetic actuator 422 is adapted to actuate its associated valve piston 212 to rapid approach position whereas the companion coil 432 of the magnetic actuator is adapted to operate the valve to rapid reverse position. As also previously stated, the remote control of all the valves is adapted to be effected from the single control "Start" and "Reverse" buttons 451 and 463. To this end the button 451 when operated energizes a coil 452 (Figure 24), the button operating to close the circuit through the coil from the line L—3 to the line L—1 by means of a main switch 456 which must first be closed to condition the electrical control circuits. Coil 452 when energized closes a set of contacts 454 which, when closed, establish a holding circuit for coil 452 from line L—3 through the coil 452, the contacts 454, auxiliary contacts 450 respectively associated with and closed by the contactors 442, contacts 460 which are now closed, and the magnetic controllers 442 back to the line L—1. It will be noted that if none of the motors has been energized by the push buttons 444, 446 and 448, then none of the contacts 450 will be closed and the holding circuit 452 is not established. The energization of any motor, however, will establish the holding circuit. The operation of coil 452 also closes switch contacts 457, one for each head structure, and these contacts individually energize their associated coils 430 by closing the circuit from the line L—3 through the magnetic contactors 442 through the contacts 457, the contacts 458 which are now closed, the coils 430, and the contactors 442 back to the line L—1. It will be seen that the coil 430 for each head structure for shifting valve 212 to rapid approach position is energized only if the magnetic controller 442 for such head is closed.

As each head structure moves from home position, dog 396 is disengaged from roller 402 and operates its associated limit switch 398 whereby to open switches 458 and 460 and close switch 462 (see Figures 22 and 24). The opening of these switches breaks the holding circuit for the coil 452 and also deenergizes the forward actuating coils 430. The deenergization of coil 452 opens the contacts 457 and 454.

The contact 460 which is companion to each unit is allowed to be broken in direct response to the movement of the unit and, therefore, when the units as a group have been started in their forward direction and all contactors 460 have been opened, the holding contact 454 causes the coil 452 to be deenergized. The above arrangement is necessary because of the fact that the valve is actuated from its forward position to feed by a mechanical control dog arrangement, and, if the magnetic actuator is not deenergized prior to such actuation, the valve will again move into a forward approach position.

It should also be clearly understood that each unit is capable of a certain length of approach, which may vary as compared with one of the other units. Therefore, the individual deenergizing of each companion magnetic actuator presents a practical and safe arrangement, and to maintain the relay energized until all of the units have been properly actuated insures that all of the units will be properly started in their forward approach.

As the contacts 458 and 460 are opened, contacts 462 are simultaneously closed, so that when contacts 286 are also closed by valves 214 at the end of the feeding operation, a circuit will be established from the line L—3 through the contactors 442, switches 286, contacts 462, coils 432 and the contactors 442 back to the line L—1. The energization of coils 432 causes the shifting of valves 212 to rapid reverse position as previously discussed. The reverse actuator coils 432 may also be operated at any time after the closing of switches 462 by the "Reverse" control button 463. This control button is adapted to close a circuit through a coil 464 from the line L—3 through the coil 464, switch 463 and main switch 456 back to the line L—1. The energization of coil 464 closes contacts 466 which, if switches 462 are closed, complete a circuit from the line L—3 through contactors 442, switches 466, contacts 462, coils 432 and contactors 442 back to the line L—1. As the head structures are individually restored to home position, control dogs 396 operate controllers 398 to open switches 462 and close switches 458 and 460 slightly before the control dogs 412 shift the valve pistons 212 to a neutral position. It should further be understood that the contacts 462 may be broken manually by manipulating the levers carrying the rollers 402.

From the aforesaid description, it will be apparent that manual control buttons indicated as "Start" and "Reverse" are employed for the purpose of remote control of all of the units provided all of the magnetic controllers 442 are properly in an engaged position. The magnetic actuator 432 is not only used with the reverse button 463 control arrangement, but also is used in conjunction with the individual reversal of each unit in combination with contactor 286. It will further be apparent that the operator is compelled to manipulate either the push button marked "Start" or the push button marked "Reverse" in case any trouble should be experienced, such as improper loading of a work piece or breaking of a cutter or the like. Therefore, if all units are in a forward approach when an emergency arises, the only action had is by manipulating the push button "Reverse" and thereby causing all of the units to be automatically reversed to their starting positions.

The aforesaid control arrangement also allows the remote control to individual units. In other words, I select one of the magnetic controllers 442 through the agency of the proper push button (namely buttons 444, 446, and 448), and then I use the push buttons "Start" and "Reverse" for manipulating a unit companion to said controller. This precludes the usual additional control for selecting purposes.

Statement of operation

Assuming the head frame structures all to be in home or withdrawn position, the operator initiates operation of the machine by first closing the main switch 456 to energize the electrical control circuit. The upper push buttons of the sets of buttons 444, 446 and 448 are then operated, energizing the motors or prime movers for the individual head frame structures 40a, 40b and 40c. If all the frames are to be operated, all three of the push buttons will be closed. The operation of the push buttons closes the individual magnetic contactors 442, initiating operation of the motors and closing their corresponding conventional motor-holding circuits (not shown). As the motors begin operation, the rapid traverse and feed pumps associated therewith begin the circulation of the hydraulic actuating fluid. At this time the individual control valves 212 are in neutral position, and the valves 214 are also in neutral position so that the fluid delivered by the rapid traverse and feed pumps is merely idly circulated.

The control valves 212 may be manually operated by means of the control levers 436 secured to shafts 252, if desired, but assuming that automatic operation is to be effected, the operator closes the "Start" switch 451. Closing the "Start" switch energizes coil 452 closing contacts 454 and 457. If any of the motors 1, 2 or 3 have been energized, their associated contactors 442 and auxiliary switches 458 will be closed, thereby permitting a holding circuit for the coil 452 to be established through the contacts 454. The closing of the contacts 457 causes the energization of the forward actuator coil 430 for each unit which has been energized. The coils 430 shift the valves 212 to their rapid approach position wherein the ports 234 are alined with the ports 230 causing the transmission of fluid to the actuators 414 in a rapid approach direction. As the valves 212 are shifted to rapid approach position, the corresponding valves 214 are shifted to feed position by means of the channels 270 as previously described. Accordingly fluid is also directed from the feed pumps to the actuators 114 to effect the rapid approach movement thereof. As the head structures move away from home position, controllers 398 are operated by control dogs 396 to open switches 458 and 460 and close switches 462 for each unit. This de-energizes the coils 430 and also breaks the holding circuit for the coil 452. As the heads reach their feed position, their associated control dogs 408 cause the mechanical shifting of valves 212 into feed position wherein the ports 234 are alined with the ports 278. Fluid from the rapid traverse pumps is thus cut off from the actuators 114, but the valves 214 remain in feeding position causing the transmission of fluid from the feed pumps to the actuators and propelling them in the continued forward direction at feeding speed. At the end of the feeding stroke the control dogs 410 operate to shift the valves 212 to neutral position. This causes a shifting of the valves 214 to neutral position by means of the fluid channels 272 and 270 as previously described, but due to the orifice control mechanism 318 (Figure 11) a dwell or delay may be effected in the shifting of the valve members 214. As the valves 214 complete their movements into neutral position, to the right as seen in Figure 12, switches 286 are operated in the manner previously described. Switches 462 having been previously closed, the closing of switches 286 completes a circuit to the reverse actuating coils 432 causing the shifting of the control valves 212 to rapid reverse position wherein the ports 236 are alined with the ports 226. Fluid is now circulated from the rapid traverse pumps to the actuators 114 to effect rapid reverse movement. The movement of valves 212 to rapid reverse position does not cause movement of the valves 214 so they remain in neutral or circulating position. As the head frames return to home or restored position, control dogs 396 cause the opening of switches 462 and the closing of switches 458 and 460. The opening of switches 462 deenergizes the reverse coils 432, but the closing of switches 458 and 460 does not reenergize the forward operating coils 430, due to the fact that switches 457 and 454 have been previously opened and cannot be reclosed except by another operation of the main "Start" button 451. Immediately after the opening of switches 462 as the head frames reach home position, control dogs 412 operate to shift the valves 212 to neutral position. The valves 214 remain in neutral position, and accordingly fluid from both the rapid traverse and feed pumps is again circulated idly within the hydraulic system, and the cycle of operation has been completed. At any time after the head frames have left home position, resulting in the opening of switches 458 and 460, and in the closing of switches 462, the reverse coils 432 may be operated from the "Reverse" button 463 through the switches 466 which are closed by the coil 464 associated with the "Reverse" button. By this means should any emergency or difficulty be incountered, all of the head frame structures may be withdrawn or returned to home position by the manipulation of a single button, the "Reverse" button 463.

It is to be understood that each head structure is provided with its own control valve 208 and its own control bar 394 and associated control cams and switch structures so that the cycling of the head is controlled in accordance with its own movements after the initiation of the operation by the pressing of the common "Start" button 451.

Displacement control mechanism

One of the most difficult problems to solve in connection with the design of hydraulic transmissions is that of providing a practical, efficient control of the variable displacement of a pump. Many attempts have been made to solve this problem and, to my knowledge, none of these attempts has been wholly successful. In conventional hydraulic systems with which I am familiar positive coaction between elements designed to control pump displacement has not been obtained, and as a result the displacement control has not satisfied the demand in the industry for a simple, practical control arrangement. In fact, hydraulic controls should be designed with the idea of enabling even those unskilled in the art to understand the function of such controls.

I have previously explained the functioning of the simple eccentric driving mechanism 176 disclosed in Figure 4, which includes the crank pin 174 and eccentric driving ring 178. That arrangement satisfies certain requirements in the field, but certain environments require further adjustment of the piston stroke. I accomplish this by incorporating within the pump housing 154 a simple cam device 468 (see particularly Figures 28 to 30, inclusive). This cam device 468 includes an annular body portion 470 and a plurality of lateral cam elements 472 projecting laterally of the body 470.

These cam elements 472 are companion to pivoted pump fingers 474, which fingers are interposed between the inner ends of the pistons 158 and the periphery of the ring 180 of the eccentric driving mechanism 176. For a more detailed description and explanation of the pivoted fingers 474, reference is made to my copending application, Serial No. 548,569, filed July 2, 1931, Patent No. 2,048,524, and my Patent No. 1,989,118. When these cam elements 472 occupy the position shown in Figures 27 to 29, inclusive, they serve to limit the inward movement of the fingers 474. In other words, the cam elements 472 serve to decrease the effective displacement of the pump. The cam structure 468 comprising the cam disc 470 may be rotated within limits determined by the adjustable stop member 498, (Figures 25 and 26). Stop pins 476 carried by the pump housing maintain the cam disc 470 in position to be rotated, as shown in Figures 27 and 29, while permitting the cam disc to be disassembled by matching the pins 476 with the slots 478 of the cam disc. The shifting of the cam mechanism 468 is accomplished by rotating a gear segment 482, which meshes with complementary teeth provided along the periphery of the cam body 470, said segment being mounted upon a shaft 484. By shifting the cam device 468, the effectiveness of the cam elements 472 upon the fingers 474 and consequently upon the pump pistons 158 may be varied. Thus when the cam elements 472 are shifted to the extreme position from that disclosed in Figures 28 and 29, they do not engage the fingers 474 and permit the driving mechanism 176 to function as previously described in connection with Figure 4.

Obviously the limitation with respect to the range of stroke of the pistons 158, which is controlled by the cam elements 472, will vary in accordance with the environment in which the device is to be employed. I have found it practical to select a maximum normal displacement in accordance with the circumstances under which the pump is to be used by adjusting the eccentric driving mechanism 176 and to vary from said normal displacement to a minimum displacement requirement by interrupting the movement of the fingers 474, as above described. I have found that better results in the propulsion of a hydraulic actuator—for example, the actuator 114—are obtained when the displacement in the lower ranges is controlled by the cam mechanism 468. At extremely low displacement, or in other words, relatively short piston strokes, leakage is reduced to a minimum, and material or metal expansion is also obviated. It should be understood that the number of pistons employed controls the practical range of variation which may be accomplished by controlling the finger movements. I have found it practical to select a normal pump displacement of half the piston stroke by adjusting the driving mechanism 176, and to employ the finger or cam control mechanism to vary the displacement from this half stroke point to zero when five pistons are employed. Obviously if the number of pistons is changed, this will vary the ranged over which the cam or finger control may be used.

Referring to Figures 25 and 26, it will be seen that I propose to automatically shift the cam mechanism 468 through the agency of a hydraulic actuator designated generally by the numeral 486. This actuator is supplied with fluid pressure through a passage 488 (Figure 26), which pressure causes a piston 490 of the actuator 486 to shift to the left, the piston rod 492 of said actuator providing a rack which meshes with a gear segment 494. This gear segment 494 is mounted on the shaft 484, which also carries the gear segment 482. Therefore, shifting the piston 490 to the left (Figure 26) causes the cam mechanism 468 to be adjusted. A spring 496 serves to shift the piston 490 to the right upon release of pressure within passage 488. An adjustable stop 498, which may be adjusted through the agency of a knurled head 500, serves to limit the forward movement of the piston 490.

A valve mechanism 502 serves to direct fluid to the actuator from a suitable source such as the circulating fluid of the rapid traverse pump 134. The valve 502 includes a valve piston 504, which carries an extension 506. This extension 506 is adapted to engage a lever 508 (Figure 15). A spring 510 urges the valve piston 504 outwardly, and a conduit or channel 512 at one extremity of the valve mechanism 502 connects with the channel 488. Fluid pressure is introduced to the valve through a port 514, which communicates with a longitudinal valve passage 516 and a cross channel or passage 518 when the valve member 504 is shifted to the left. Thus the shifting of the valve member 504 to the left in response to the engagement of the extension 506 with the lever 508 establishes communication of fluid under pressure with the right extremity of the hydraulic actuator 486, and thereby causes the shifting of the piston 490 to the left. This shifting may be accomplished at any desirable point in the cycle of movement of the head. When valve 504 is permitted to return to the right, to the position of Figure 10, valve passage 518 is brought into communication with a drain passage 519 whereby to relieve the pressure within channel 488, permitting spring 496 to act to return the piston 490. By properly positioning a dog 520, which is adapted to be engaged by the finger or lever mechanism 508, the shifting of the valve member 504 may take place at the desired point in the cycle of operation.

From the foregoing it will be apparent that, when the eccentric driving mechanism 176 has been adjusted to cause the pump 136 to deliver fluid at a normal rate of displacement, the cam elements 472 are not engaged by the fingers 474. When a decrease in displacement is desired, which is determined by the position of the dog 520, the valve member 504 is shifted to the left, which causes fluid to be delivered to the right end of the hydraulic actuator 486, thereby causing a shifting of the cam mechanism 468 and a consequent decrease in the fluid displacement of the pump 136.

*Valve incorporating reversible feed.*

In certain instances it is desirable to provide a feed rate in reverse as well as in forward direction. This is accomplished by slightly altering the valve structure 208 previously described, but this altering does not change the structural characteristics, the size of the valve or the control thereof. I have shown this slightly modified valve in Figures 32 to 34, inclusive, and have designated the valve generally by the numeral 208a. Structures of the valve 208a corresponding with those of the valve 208 are given corresponding numbers. The valve body 254a is made from the same casting as the valve body or housing 254 previously described, it being necessary only to slightly modify the body by machining operations. The valve piston 212a is similar in structure and function with the valve piston 212 previously described, but to effect feed reverse operations the valve piston 214a has been somewhat altered, passageway 276 associated with the passage 270a has been eliminated, the connections to the feed pump have been altered, and a stop device 529 has been added for a purpose presently to be described. The dwell orifice device 318 also is eliminated.

More particularly, in this instance the valve 214a is directly connected to the feed pump by means of a conduit 522, the return to the feed pump from the valve being through return conduit 390 as previously described. The conduit 522 communicates with a cross channel 524 provided in valve 214a. This cross channel in turn communicates with a longitudinal channel 526 provided in the valve, the longitudinal channel communicating at its end with another cross channel 528. Cross channel 528 is adapted to communicate with port 266a associated with one end of the hydraulic actuator, when valve 214a is in the position shown in Figures 32 and 34, whereas cross channel 524 is adapted to communicate with port 262a connected to the other end of the hydraulic actuator, when valve 214a is shifted to the left. The central portion 527 of valve 214a is adapted to connect either port 266a or 262a to the return conduit 390 depending upon the shifted position of the valve.

The stop mechanism for the valve 214a comprises a cam 530 secured to the control shaft 252 of the valve 212a, the cam being secured on the shaft by means of a pin 532. This control cam is adapted to actuate the stop pin or abutment member 529 through the intermediary of a ball 538. To this end the ball is adapted to engage in a slot 540 in the abutment pin, the arrangement being such that when the ball is thrust to the right, as seen in Figure 34, by the cam, the stop pin 529 will be raised. A spring 534 adjustably held in position by means of a threaded member 536 serves normally to hold the stop pin downwardly in stopping position. It will be noted from Figures 32 and 34, that the electrical contactor piston 294 associated with switch 286 has been machined as indicated at 542 so as to enter a counter-bore 544 in valve 214a.

In the operation of the feed reverse valve structure, and assuming the valve pistons 212a and 214a to be in their neutral positions, the valve piston 212a is first shifted either manually or by manipulation of the "Start" switch 451 to its rapid approach position alining port 234a with the port 230a, causing the transmission of fluid to the hydraulic actuator in rapid approach direction as previously described. As the valve 212a is shifted, fluid is transmitted through passages 278a and 270a shifting the valve member 214a to its extreme left position which is its feed approach position wherein cross channel 524 is alined with port 262a and port 266a is connected to the return conduit 390. Accordingly fluid is also directed from the feed pump to the hydraulic actuator by means of the valve 214a. As the head structure associated with the valve reaches a predetermined position, a control dog operates to shift valve 212a to its feed approach position wherein port 230a is cut off from port 234a, but pressure fluid communication is maintained between port 234a and passage 278a to hold valve 214a in its feed approach position. Accordingly communication between the rapid traverse pump and the hydraulic actuator is cut off, but communication between the feed pump and the actuator is maintained and the actuator progresses at feeding speed.

At the end of the forward feed operation a control dog shifts valve 212a to its feed reverse position wherein the port 236a of the valve is alined with channel 282a causing the hydraulic shifting of valve piston 214a to the right, into the position shown in Figures 32 and 34, wherein the valve piston engages the stop pin 529 which is at this time in operative position. This position of valve 214a is its feed reverse position, wherein the cross channel 528 is connected to port 266a, the port 262a being connected to the return conduit 390. Accordingly in this position of the valves fluid is transmitted from the feed pump to the hydraulic actuator to effect a feed reverse movement, communication between the actuator and the rapid traverse pump being cut off.

At a predetermined position in the movement of the head structure a control dog further operates valve 212a to its neutral position wherein the stop pin 529 is raised by the correlated movement of shaft 252. In the neutral position of valve 212a channel 282a remains in pressure communication with port 236a, thus causing valve 214a to complete its movement to the extreme right, to its neutral position. As valve 214a reaches its neutral position, switch 286 is operated, and the operation of this switch causes the operation of the reverse actuating coil to shift the valve 212a to its rapid reverse position, as previously described, wherein the port 236a is lined with the port 226a, while leaving channel 282a in communication with port 236a so as to maintain the valve 214a in its neutral position. In the neutral position of valve 214a the valve is shifted sufficiently to the right so as to by-pass inlet conduit 522 directly to the exhaust port 390 by means of valve passage 527. Accordingly the feed pump is operatively disconnected from the hydraulic actuator, but the rapid traverse pump is now connected with the hydraulic actuator so as to effect the rapid reverse movement thereof. As the head frame reaches home position, a dog shifts valve 212a to neutral position cutting off communication between ports 236a and 226a, thus cutting off communication between the rapid traverse pump and the hydraulic actuator, but leaving port 236a in communication with channel 282a to maintain the valve 214a in its neutral position. Both the rapid traverse and the feed pumps are now cut off from communication with the actuator and the cycle of operation is complete.

Attention is also directed to the disclosure of a modified electrical actuator designated generally by the numeral 422a in Figure 19. This actuator is a modification of the actuator 422 shown in Figure 17, and is adapted to be connected directly with one extremity of the valve member 212, as distinguished from the interconnection made with said valve by the magnetic actuator 422.

Referring again to Figs. 1 and 2, it will be noted that the prime mover or electric motor 50 is mounted upon a base which may be adjusted through the agency of a screw 51 to vary the center distances between the pulleys 62 and 64. In the event it is found necessary to increase or decrease the speed of the main drive shaft 54 with respect to the speed of the motor 50, it is only necessary to change one of the pulleys 62 and 64, and adjust the center distances by manipulating the screw 51. In some instances it is desirable to replace both pulleys by a new set. V belts and pulleys are now kept in stock in the same manner as pick off gears, and said belt and pulley arrangement is much more convenient than conventional pick off gear arrangements. Mechanical vibration resulting from the use of conventional gears is completely eliminated by the use of the V belt and pulley arrangement. This is of vital importance since the advent of tungsten carbide tools and the like.

No claims are directed herein to the pump construction or the valve construction per se, claims to these devices being presented in divisional applications hereof, Serial No. 375,500, filed January 22, 1941, and Serial No. 375,501, filed January 22, 1941.

Obviously numerous modifications and changes may be made without departing from the spirit and scope of the above described invention.

Having thus described my invention, what I claim as new and desire to secure by Letters Patent is:

1. A machine tool unit including a head frame structure adapted to be mounted upon a main frame, a rotary supporting spindle on said head frame, a prime mover, a transmission between said prime mover and said spindle including a main drive shaft and a flexible belt driving connection between said drive shaft and said prime mover, whereby to preclude vibratory action which might otherwise result from misalinement between said prime mover and said drive shaft, a feed transmission, a rapid traverse transmission, means for driving said feed and rapid traverse transmissions, a spindle translating element adapted to be actuated by said feed and rapid traverse transmissions, and means for controlling the operative effectiveness of said last mentioned transmissions, said head frame and parts supported thereby presenting a self-contained machine tool unit.

2. A machine tool unit including a head frame structure adapted to be mounted upon a main frame, a rotary supporting spindle on said head frame, a prime mover, a transmission between said prime mover and said spindle including a main drive shaft and a belt and grooved pulley connection between said drive shaft and said prime mover, whereby to preclude vibratory action which might otherwise result from misalinement between said prime mover and said drive shaft, a feed transmission driven from said prime mover, a hydraulic rapid traverse transmission driven from said prime mover, a spindle translating element adapted to be actuated by said feed and rapid traverse transmissions, and means for controlling the operative effectiveness of said last mentioned transmissions, said head frame and parts supported thereby presenting a self-contained machine tool unit.

3. A machine tool unit including a head frame structure adapted to be mounted upon a main frame, a rotary supporting spindle on said head frame, a prime mover for rotating said spindle, a feed pump, a rapid traverse pump, a drive shaft common to and directly driving said pumps, means for driving said shaft, a hydraulic actuator for translating said supporting spindle and associated with said pumps, and valve means for controlling the effectiveness of said pumps with respect to said actuator, said head frame and parts supported thereby presenting a self-contained machine tool unit.

4. A machine tool unit including a head frame structure adapted to be mounted upon a main frame, a rotary supporting spindle on said head frame, a prime mover such as an electric motor on said head frame, a main drive shaft, a driving connection between said prime mover and said drive shaft, means associating said supporting spindle directly with said drive shaft, a second drive shaft, areal contacting gearing connecting said shafts, a feed transmission associated with said second shaft, a rapid traverse transmission associated with said second shaft, a spindle translating element adapted to be actuated by said transmissions, and means for selectively controlling the operative effectiveness of said transmissions with respect to said spindle translating element.

5. A machine tool unit including a head frame structure adapted to be mounted upon a main frame, a rotary supporting spindle on said head frame, a prime mover for rotating said spindle, a variable displacement feed pump, a rapid traverse pump, a drive shaft common to and directly driving said pumps, means for driving said drive shaft, eccentrically operable driving mechanism for said feed pump being provided at one extremity of said drive shaft, a hydraulic actuator for translating said supporting spindle and associated with said pumps, and valve means for controlling the effectiveness of said pumps with respect to said actuator, said head frame and parts supported thereby presenting a self-contained machine tool unit.

6. In a transmission, a rotary drive shaft, a bearing structure therefor, a rapid traverse pump associated directly with one extremity of said drive shaft, an eccentrically operable driving mechanism associated directly with the opposite extremity of said drive shaft, and a feed pump associated with said eccentric driving mechanism.

7. In a transmission, a rotary drive shaft, a bearing structure therefor, a first pump associated directly with one extremity of said drive shaft, an eccentrically operable driving mechanism associated directly with the opposite extremity of said drive shaft, a variable displacement feed pump associated with said eccentric driving mechanism, and means for adjusting said eccentric driving mechanism.

8. In combination, a fluid circuit, a fluid motor arranged in said circuit, an electrical circuit valve means including a relatively shiftable valve member and housing having cooperative passages for controlling the fluid flow in said fluid circuit, and an electrical contactor mechanism directly associated with said valve means operable in response to the shifting of said valve means for controlling the functioning of said electrical circuit in proper timed relation with the functioning of said fluid circuit.

9. In a fluid actuator system, a fluid motor for shifting a machine element and the like, fluid pressure generating means, shiftable valve means for controlling the direction of fluid flow from said fluid pressure generating means to said fluid motor, and electrical means operable in response to certain shifting of said valve means to effect the automatic shifting of said valve means from one given position to another for controlling the flow of fluid to said fluid motor.

10. In a fluid actuator system, a fluid motor for shifting a machine element and the like, fluid pressure generating means, valve means for controlling the delivery of fluid from said fluid pressure generating means to said fluid motor, said valve means including a shiftable valve member and a second valve member shiftable in response to the shifting of the first valve member, and means operable in response to the shifting of the second valve member for effecting movement of the first valve member for controlling the flow of fluid to said fluid motor.

11. In a fluid actuator system, a fluid motor for shifting a machine element and the like, fluid pressure generating means, valve means for controlling the delivery of fluid from said fluid pressure generating means to said fluid motor, said valve means including a shiftable valve member and a second valve member shiftable in response to the shifting of the first valve member, and electrical contactor means operable in response to the shifting of the second valve member for effecting movement of the first valve member for controlling the flow of fluid to said fluid motor.

12. In a self-contained machine tool unit, in combination with a machine tool structure, a fluid transmission, an electrical transmission, and a single remote control means adapted when engaged to initiate the automatic timed functioning of said fluid and electrical transmissions.

13. In a plurality of self-contained machine tool units, in combination with a machine tool structure which includes a plurality of such units, a fluid transmission for shifting each of said units, an electrical transmission associated with each unit, and a single remote control means adapted when engaged to initiate the automatic timed functioning of said fluid and electrical transmissions.

14. In combination with a machine tool structure or the like having a fluid actuator system, a lubricating mechanism including a housing, a piston shiftable within said housing in response to the pressure of a source of lubricant supply, lubricant in said actuator system, fluid conducting means for directing lubricant from said source of supply into said housing, lubricant conducting means for directing lubricant from said housing to the machine parts to be lubricated, and valve means associated with said housing to permit the intake of lubricant when the piston moves in one direction, and to permit the discharge of lubricant when said piston moves in the opposite direction.

15. A machine tool unit including a head frame structure adapted to be mounted upon a main frame, a rotary supporting spindle on said head frame, a prime mover for rotating said spindle, a plurality of pumps, a drive shaft common to and directly driving said pumps, means for driving said drive shaft, a fluid actuator for translating said supporting spindle and associated with said pumps, and valve means for controlling the effectiveness of said pumps with respect to said actuator, said head frame and parts supported thereby presenting a self-contained machine tool unit.

16. A machine tool unit including a head frame structure adapted to be mounted upon a main frame, a rotary supporting spindle on said head frame, a prime mover for rotating said spindle, a plurality of pumps, a drive shaft common to and directly driving said pumps, said drive shaft being driven from said prime mover, a hydraulic actuator for translating said supporting spindle and associated with said pumps, and valve means for controlling the effectiveness of said pumps with respect to said actuator.

17. A machine tool unit including a head frame structure adapted to be mounted upon a main frame, a rotary supporting spindle on said head frame, a prime mover for rotating said spindle, a variable displacement feed pump, a rapid traverse pump, a drive shaft common to and directly driving said pumps, said drive shaft being driven from said prime mover, adjustable driving mechanism for said feed pump being provided at one extremity of said drive shaft, a hydraulic actuator for translating said supporting spindle and associated with said pumps, and valve means for controlling the effectiveness of said pumps with respect to said actuator, said head frame and parts supported thereby presenting a self-contained machine tool unit.

18. A machine tool unit including a head frame structure adapted to be mounted upon a main frame, a rotary supporting spindle on said head frame, a prime mover for rotating said spindle, a variable displacement feed pump, a rapid traverse pump, a drive shaft common to and directly driving said pumps, means for driving said drive shaft, adjustable driving mechanism for said feed pump being provided at one extremity of said drive shaft, a hydraulic actuator for translating said supporting spindle and associated with said pumps, and valve means for controlling the effectiveness of said pumps with respect to said actuator.

19. In a transmission, a rotary drive shaft, a bearing structure therefor, a fluid pump directly driven by said drive shaft, an adjustable driving mechanism associated directly with an extremity of said drive shaft, and a second pump associated with said adjustable driving mechanism.

20. In a transmission, a rotary drive shaft, a bearing structure therefor, a fluid pump associated directly with one extremity of said drive shaft, an adjustable driving mechanism associated directly with the opposite extremity of said drive shaft, and a second pump associated with said adjustable driving mechanism, each of said pumps being detachable with respect to the drive shaft independently of each other.

21. In a transmission, a rotary drive shaft, a bearing structure therefor, a rapid traverse pump directly driven by said drive shaft, an adjustable driving mechanism associated directly with an extremity of said drive shaft, a variable displacement feed pump associated with said adjustable driving mechanism, and means for adjusting said driving mechanism.

22. In a transmission, a rotary drive shaft, a bearing structure therefor, a pump associated directly with one extremity of said drive shaft, an adjustable driving mechanism associated directly with the opposite extremity of said drive shaft, and a pump coupled with said adjustable driving mechanism, said last named pump including a housing, a plurality of reciprocable pistons in said housing for receiving and discharging fluid, and means interposed between said adjustable driving mechanism and said pistons for limiting the piston shifting effectiveness of said adjustable driving mechanism.

23. In a single purpose machine tool structure, an electric motor, a main frame housing supporting said motor, a rotatable main drive shaft mounted in said main frame housing, driving connection between said motor and main drive shaft, propelling means secured to the main frame housing, a second drive shaft, a driven gear on said second drive shaft, a driving gear on said main drive shaft, power means for actuating said propelling means, said power means being directly driven from said second shaft, and power conducting means between said power means and propelling means positioned within the main frame housing, whereby the aforesaid electric motor, main drive shaft, propelling means, and power means may be individually serviced, exchanged, and inspected.

24. In a machine tool structure, an electric motor, a magnetic controller for said electric motor, a unitary remote control panel for controlling said magnetic controller, a magnetic actuator for controlling the effective work performed by said electric motor, and electric circuit means associated with said magnetic controller adapted and arranged to permit actuation of the magnetic actuator only when said electric motor is operating.

25. In a machine tool structure, a plurality of electric motors, magnetic controller means for said motors, a unitary remote control panel for controlling said magnetic controller means, a plurality of magnetic actuators for controlling the effective work performed by said electric motors, and electric circuit means associated with said magnetic controller means adapted and arranged to permit actuation of the magnetic actuators only when said electric motors are operating.

26. In a machine tool structure, an electric motor, a magnetic controller for said electric motor, a selective control including a single start-and-stop button mechanism, a plurality of magnetic actuators for controlling the effective work performed by said electric motor, and electric circuit means associated with said magnetic controller adapted and arranged to permit actuation of the magnetic actuators only when said electric motor is operating.

27. In a single purpose machine tool structure, an electric motor, a main frame housing supporting said motor, a rotatable main drive shaft mounted in said main frame housing, flexible driving connection between said motor and main drive shaft, propelling means secured to the main frame housing, a second drive shaft, a driven gear on said second drive shaft, a driving gear on said main drive shaft, power means for actuating said propelling means, said power means being directly driven from said second shaft, and power conducting means between said power means and propelling means positioned within the main frame housing, whereby the aforesaid electric motor, main drive shaft, propelling means, and power means may be individually serviced, exchanged, and inspected, said main frame housing and elements supported thereby being constructed and arranged so as to present a self-contained actuator unit.

28. Control and driving mechanism for fluid power generating means including a single driving member, a gear on said member, a drive shaft having driving means in driving relation with said gear, an eccentric anti-friction bearing adjustably mounted on said single driving member, and another member mounted on the single driving member for adjustably positioning said eccentric bearing.

29. Control and driving mechanism for fluid power generating means including a single driving member, driving means on said member, an eccentric anti-friction bearing adjustably mounted on said single driving member, another member mounted on the single driving member for adjustably positioning said eccentric bearing, fluid power generating means associated with said adjustable bearing, and a second fluid power generating means associated with said single driving member at a position spaced from said eccentric bearing.

30. Control and driving mechanism for fluid power generating means including a single driving member, a gear on said member, an eccentric anti-friction bearing adjustably mounted on said single driving member, another member mounted on the single driving member for adjustably positioning said eccentric bearing, a main drive shaft member drivingly associated through said gear with said single driving member, and an electric motor drivingly associated with said main drive shaft.

31. In a control structure for electrical and fluid power, a housing, a plunger reciprocable within said housing, an electric contactor secured to said housing, a source of fluid power connectable with said housing, a source of electrical power connectable with said contactor, and means within the housing for causing the shifting of said plunger, whereby to operatively connect and disconnect electric power with respect to said contactor, and a fluid motor operated from said fluid power source.

32. In a control structure for electrical and fluid power, a housing, a plunger reciprocable within said housing, an electric contactor secured to said housing, a source of fluid power connectable with said housing, a source of electrical power connectable with said contactor, and a shiftable member within the housing for causing the shifting of said plunger, whereby to operatively connect and disconnect electric power with respect to said contactor, and a fluid motor operated from said fluid power source.

33. In a control structure for electric and fluid power, a housing, a plunger reciprocable within said housing, an electric contactor secured to said housing, a source of fluid power connected with said housing, a source of electric power connectable with said contactor, means within the housing for causing the shifting of said plunger, whereby to control the current flow through said contactor, and a fluid pump, the operative functioning of said rapid traverse pump being controlled as an incident to the functioning of said contactor.

34. In a control structure for electric and fluid power, a housing, a plunger reciprocable within said housing, an electric contactor secured to said housing, a source of fluid power connected with said housing, said contactor being movable to a plurality of predetermined operative positions, a source of electric power connectable with said contactor, means within the housing for causing the shifting of said plunger, whereby to control the movement of said contactor, and a fluid pump, said fluid pump being functionally inoperable when said contactor is in one of said predetermined positions.

35. In a machine tool structure of the self-contained unit type, a shiftable frame structure, a fluid reservoir integral with said frame structure, said reservoir being so disposed with respect to said frame structure as to maintain said structure at a uniform temperature due to the presence of fluid in said reservoir, pumping means secured to the frame structure, fluid channels within the frame structure, and fluid ducts within said reservoir for connecting the pumping means with the fluid channels in the frame structure, whereby to preclude leakage and avoid the necessity of employing external fluid ducts.

36. In a machine tool structure of the self-contained unit type, a shiftable frame structure, a fluid reservoir integral with said frame structure, said reservoir being so disposed with respect to said frame structure as to maintain said structure at a uniform temperature due to the presence of fluid in said reservoir, pumping means secured to the frame structure, fluid channels within the frame structure, fluid ducts within said reservoir for connecting the pumping means with the fluid channels in the frame structure, whereby to preclude leakage and avoid the necessity of employing external fluid ducts, and a valve structure associated directly with the channels in the frame structure without the necessity of employing external piping and the like.

37. In a machine tool structure of the self-contained unit type, a shiftable supporting frame structure, a fluid reservoir within said frame structure, pumping means secured to said frame structure, fluid channels in the frame structure, fluid ducts within said reservoir for connecting the pumping means with said fluid channels, whereby to preclude leakage and to obviate the necessity of employing external fluid ducts, and an overload valve mechanism carried by said frame structure and adapted to permit the overflow of fluid above a predetermined high pressure into said reservoir.

38. In a machine tool structure of the self-contained unit type, a shiftable supporting frame structure, a fluid reservoir within said frame structure, pumping means secured to said frame structure, fluid channels in the frame structure, fluid ducts within said reservoir for connecting the pumping means with said fluid channels, whereby to preclude leakage to obviate the necessity of employing external fluid ducts, operating machine elements associated with said frame structure, and a fluid actuated lubricating mechanism carried by said frame structure for lubricating said elements.

39. An improvement in a machine tool structure of the self-contained unit type including a supporting frame structure, a variable displacement pump carried thereby, a hydraulic actuator operatively associated with said pump for propelling the frame structure, a first means for varying the fluid displacement of the pump, hydraulically actuated means and control means therefor for further automatically varying the fluid displacement of the pump in timed relation with the actuation of said frame structure, and valve means for controlling the direction of travel, starting and stopping of said actuator.

40. An improvement in a machine tool structure of the self-contained unit type including a supporting frame structure, a variable displacement feed pump carried thereby, a hydraulic actuator operatively associated with said pump for propelling the frame structure, means for automatically varying the displacement of the pump in timed relation with the actuation of said frame structure in a given direction, valve means for controlling the direction of travel, starting and stopping of said actuator, and a rapid traverse pump for imparting rapid traverse movement to said frame structure, said feed pump also being adapted to propel the actuator in the opposite direction at a feeding rate.

41. A machine tool unit including a head frame structure adapted to be mounted upon a main frame, a rotary supporting spindle on said head frame, a prime mover, a transmission between said prime mover and spindle including a main drive shaft and a flexible driving connection between said drive shaft and said prime mover whereby to preclude vibratory action which might otherwise result from misalinement between said prime mover and said drive shaft, a power operated feed transmission for propelling said head frame structure in opposite directions, a power operated rapid traverse transmission, a spindle translating element adapted to be actuated by said feed and rapid traverse transmissions, and means for controlling the operative effectiveness of said transmissions, said head frame and parts supported thereby presenting a self-contained machine tool unit.

42. In combination, a fluid circuit, a fluid motor arranged in said circuit, an electrical circuit, valve means including a relatively shiftable valve member and housing having cooperative passages for controlling the fluid flow in said fluid circuit, an electrical contactor mechanism directly associated with and valve means operable in response to the shifting of said valve means for controlling the functioning of said electrical circuit in proper timed relation with the functioning of said fluid circuit, and a reversing valve for controlling the direction of fluid flow in said fluid circuit, said first valve means being shiftable as an incident to the shifting of said reversing valve.

43. In combination with a fluid actuating system for machine tools and the like, an automatic lubrication system including a fluid actuated lubricating pump, a fluid lubricant reservoir for the pump, and a fluid power channel between said pump and said fluid actuating system, whereby the lubricating pump may be actuated in timed relation with said fluid actuating system.

44. In combination with a fluid actuating system for machine tools and the like, an automatic lubrication system including a fluid actuated lubricating pump, said pump having a plunger which is adapted to automatically shift in response to operative functioning of said fluid actuating system, a fluid power channel operatively connecting said plunger with said fluid actuating system, a lubricant reservoir, and means for directing lubricant discharged by said pump to locations requiring lubrication.

45. In combination with a fluid actuated machine tool and the like having guideways requiring lubrication, a fluid actuated lubricating pump, a fluid reservoir for the pump, fluid conducting means connecting said pump with the actuating fluid of the machine tool, whereby to enable the actuation of the pump as an incident to the operative functioning of said actuating fluid, and means connecting the fluid discharge of said lubricating pump with the guideways of said machine tool.

46. In combination with a fluid actuating system for machine tools and the like, an automatic lubricating system including a fluid actuated lubricating pump, said pump being of the variable delivery type, a lubricant reservoir for the pump, and a fluid power channel between said pump and said fluid actuating system, whereby the lubricating pump may be actuated in timed relation with said fluid actuating system.

47. In a transmission, a rotary drive shaft, a bearing structure therefor, a first pump associated directly with one extremity of said drive shaft, an eccentrically operable driving mechanism associated directly with the opposite extremity of said drive shaft, and a feed pump associated with said eccentric driving mechanism.

48. In a power transmission system, actuating means for shifting a machine element and the like, power means for causing the operation of said actuating means, shiftable valve means for controlling the operation of the actuating means, and electrical means operable in response to the shifting of said valve means to effect the automatic shifting of said valve means from one given position to another whereby to effect said control of said actuating means.

49. In a power transmission system, actuating means for shifting a machine element and the like, power means for causing the operation of said actuating means, valve means for controlling the operation of the actuating means, said valve means including a shiftable valve member and a second valve member shiftable in response to the shifting of the first valve member, and electrical contactor means operable in response to the shifting of the second valve member for effecting movement of the first valve member, whereby to effect said control of said actuating means.

50. In a machine tool structure, a main frame, a head frame of the self-contained unit type shiftable on the main frame, a fluid actuator for shifting the head frame, means for operating the fluid actuator comprising power means, feed and rapid traverse pumps driven thereby, and a control valve, said power means, pumps and valve being carried by the head frame, and a fluid reservoir also carried by and integral with the head frame for supplying fluid to the pumps, said fluid reservoir being so arranged as to bring the contained fluid therein into intimate thermal relation with body portions of said head frame structure, whereby the thermal capacity of said fluid maintains the head frame structure at a substantially uniform temperature during the operative functioning of the machine tool.

51. The improvement in a machine tool structure, comprising a supporting structure, a variable displacement pump associated therewith, a hydraulic actuator operatively associated with said pump for propelling the supporting structure, a first means for varying the fluid displacement of the pump, hydraulically actuated means for further varying the fluid displacement of the pump, control means operable in timed relation with the actuation of said supporting structure for controlling the operation of said hydraulically actuated means, and valve means for controlling the direction of travel, starting and stopping of said actuator.

ERNEST J. SVENSON.